United States Patent
Ohishi

(10) Patent No.: US 10,453,184 B2
(45) Date of Patent: Oct. 22, 2019

(54) IMAGE PROCESSING APPARATUS AND X-RAY DIAGNOSIS APPARATUS

(71) Applicant: Toshiba Medical Systems Corporation, Otawara-shi (JP)

(72) Inventor: Satoru Ohishi, Otawara (JP)

(73) Assignee: Canon Medical Systems Corporation, Otawara-shi (JP)

( * ) Notice: Subject to any disclaimer, the term of this patent is extended or adjusted under 35 U.S.C. 154(b) by 97 days.

(21) Appl. No.: 14/635,421

(22) Filed: Mar. 2, 2015

(65) Prior Publication Data

US 2015/0248757 A1 Sep. 3, 2015

(30) Foreign Application Priority Data

Feb. 28, 2014 (JP) .................................. 2014-037784

(51) Int. Cl.
*G06T 5/00* (2006.01)
*G06T 7/11* (2017.01)

(52) U.S. Cl.
CPC ................ *G06T 5/002* (2013.01); *G06T 7/11* (2017.01); *G06T 2207/10081* (2013.01); *G06T 2207/10088* (2013.01); *G06T 2207/10116* (2013.01); *G06T 2207/10132* (2013.01); *G06T 2207/20012* (2013.01); *G06T 2207/20182* (2013.01); *G06T 2207/30101* (2013.01)

(58) Field of Classification Search
CPC .................. G06T 5/002; G06T 7/0081; G06T 2207/20012; G06T 2207/10081; G06T 2207/10088; G06T 2207/10116; G06T 2207/20182; G06T 2207/30101; G06T 2207/10132
See application file for complete search history.

(56) References Cited

U.S. PATENT DOCUMENTS

| 5,644,646 A | 7/1997 | Du et al. |
| 2004/0066978 A1* | 4/2004 | Nanbu ...................... G06T 5/20 382/261 |
| 2008/0144959 A1 | 6/2008 | Rasch et al. |
| 2012/0134566 A1* | 5/2012 | Nitta .................... A61B 6/5223 382/131 |
| 2012/0148123 A1* | 6/2012 | Gindele .................... G06T 7/11 382/128 |

(Continued)

FOREIGN PATENT DOCUMENTS

| CN | 102982547 | 3/2013 |
| JP | 2008-142296 | 6/2008 |

(Continued)

OTHER PUBLICATIONS

Office Action dated Dec. 11, 2018 in Japanese Patent Application No. 2015-039534.

*Primary Examiner* — Menatoallah Youssef

(74) *Attorney, Agent, or Firm* — Oblon, McClelland, Maier & Neustadt, L.L.P.

(57) ABSTRACT

An image processing apparatus includes an identification unit, a calculator, and an image processor. The identification unit identifies a group of pixels indicating an object of interest in medical image data. The calculator specifies a cross-section corresponding to the running direction of the object of interest indicated by the group of pixels in the medical image data. The image processor performs noise reduction on the cross-section identified.

11 Claims, 15 Drawing Sheets

(56) References Cited

U.S. PATENT DOCUMENTS

| | | | | |
|---|---|---|---|---|
| 2012/0201446 A1* | 8/2012 | Yang | ..................... | G06T 7/0012 |
| | | | | 382/134 |
| 2013/0202170 A1* | 8/2013 | Blezek | ............... | G06K 9/00201 |
| | | | | 382/131 |
| 2014/0294235 A1* | 10/2014 | Ishida | ................... | G06K 9/0061 |
| | | | | 382/103 |
| 2014/0363065 A1* | 12/2014 | Taerum | .............. | A61B 5/02014 |
| | | | | 382/131 |

FOREIGN PATENT DOCUMENTS

| | | |
|---|---|---|
| JP | 2008-161693 A | 7/2008 |
| JP | 2011-156288 | 8/2011 |
| JP | 2012-85969 | 5/2012 |
| JP | 2014-121593 | 7/2014 |
| WO | WO 02/086821 | 10/2002 |
| WO | WO 2009/145076 | 12/2009 |

\* cited by examiner

IMAGE PROCESSING APPARATUS AND X-RAY DIAGNOSIS APPARATUS

CROSS-REFERENCE TO RELATED APPLICATION

This application is based upon and claims the benefit of priority from Japanese Patent Application No. 2014-37784, filed 28 Feb. 2014; the entire contents of which are incorporated herein by reference.

FIELD

Embodiments described herein relate generally to an image processing apparatus, an image processing method, and an X-ray diagnosis apparatus.

BACKGROUND

A medical image diagnosis apparatus is used in medical institutions and the like to obtain information on tissues in a subject. The medical image diagnosis apparatus creates from the information a medical image such as, for example, fluoroscopic image, tomographic image, and blood flow image. The medical image is used for examination and diagnosis.

Examples of the medical image diagnosis apparatus include X-ray CT (computed tomography) systems, MRI (magnetic resonance imaging) equipment, ultrasound diagnosis apparatuses, and X-ray diagnosis apparatuses. Detection data obtained by such variety of medical image diagnosis apparatuses are subjected to various types of image processing to generate medical images. Image processing may be used to visualize a blood flow, a flow of a contrast agent, and the like in a medical image. Image processing may also be used to extract a lesion, contour of internal organs, and the like.

Examples of the image processing include noise removal or reduction, feature extraction, and pattern recognition. These are used alone or in combination as appropriate. By a technique to reduce random noise in an image, a predetermined region or site in a subject's body is clearly represented in the image.

Besides, the medical image diagnosis apparatus may obtain information on the two-dimensional region of an object, or it may obtain information on the three-dimensional region of an object. Plane data or volume data is generated based on the information on the two-dimensional region or the three-dimensional region thus obtained. The plane data is formed of a two-dimensional array of pixels, while the volume data is formed of a three-dimensional array of voxels (pixels). Each pixel or voxel of the plane data or the volume data is assigned with information (pixel value, etc.) indicating the density or the like of the object in the region.

Smoothing is known as a conventional noise reduction technique. The noise reduction for plane data is explained below. The smoothing refers to processing in which, with respect to an input value f (i, j) of a pixel (i, j), the average density of peripheral pixels around the pixel (i, j) is used as an output value g (i, j). Assuming that n×n pixels in the vicinity of the pixel (i, j) are used as the peripheral pixels, the output value g (i, j) is obtained by the following formula (1):

$$g(i, j) = \sum_{k=a}^{b} \sum_{m=c}^{d} \frac{1}{(b-a+1)(d-c+1)} \cdot f(i+k, j+m) \quad (1)$$

where a, b, c, and d indicate the coordinates of the peripheral pixels to be averaged and are integers, and 1/(b−a+1)(d−c+1) is the total number of the peripheral pixels.

However, the simple use of noise reduction may create a so-called "edge blur". The edge blur reduces the spatial resolution of an image, and the whole image is blurred. When the above noise reduction using formula (1) is applied to a medical image of a detailed blood vessel structure, pixels other than those of the blood vessel structure are also averaged (smoothed). That is, even if reducing noise, the smoothing also reduces contrast representing the blood vessel structure. As a result, the visualization of the blood vessel structure may be difficult in the medical image that is supposed to illustrate the detailed blood vessel structure.

For this reason, in addition to noise reduction in which peripheral pixels are simply averaged as described above, a weighted averaging may also be performed by weighting the peripheral pixels based on the similarity of them. In this case, an image processing apparatus calculates the similarity of a pixel and peripheral pixels around the pixel, and obtains a weighted average of them according to the similarity. The image processing apparatus uses the weighted average as a pixel value of the pixel. Thus, the image processing apparatus is capable of reducing image blur as well as reducing noise.

Further, the image processing apparatus diffuses pixel information to reduce noise. On this occasion, the degree of diffusion is determined according to whether edge information contains a pixel of interest to prevent edge blur. This processing is called anisotropic diffusion filtering.

Still further, the image processing apparatus performs noise reduction on volume data. For example, the image processing apparatus performs three-dimensional noise reduction on the volume data, or noise reduction (two-dimensional noise reduction) for the arbitrary cross-section of the volume data.

DETAILED DESCRIPTION

In general, according to one embodiment, an image processing apparatus includes an identification unit, a calculator, and an image processor. The identification unit identifies a group of pixels indicating an object of interest in medical image data. The calculator specifies a cross-section corresponding to the running direction of the object of interest indicated by the group of pixels in the medical image data. The image processor performs noise reduction on the cross-section identified.

Referring now to FIGS. 1 to 14, a description is given of an image processing apparatus according to first to fourth embodiments.

First Embodiment

Figure 1:
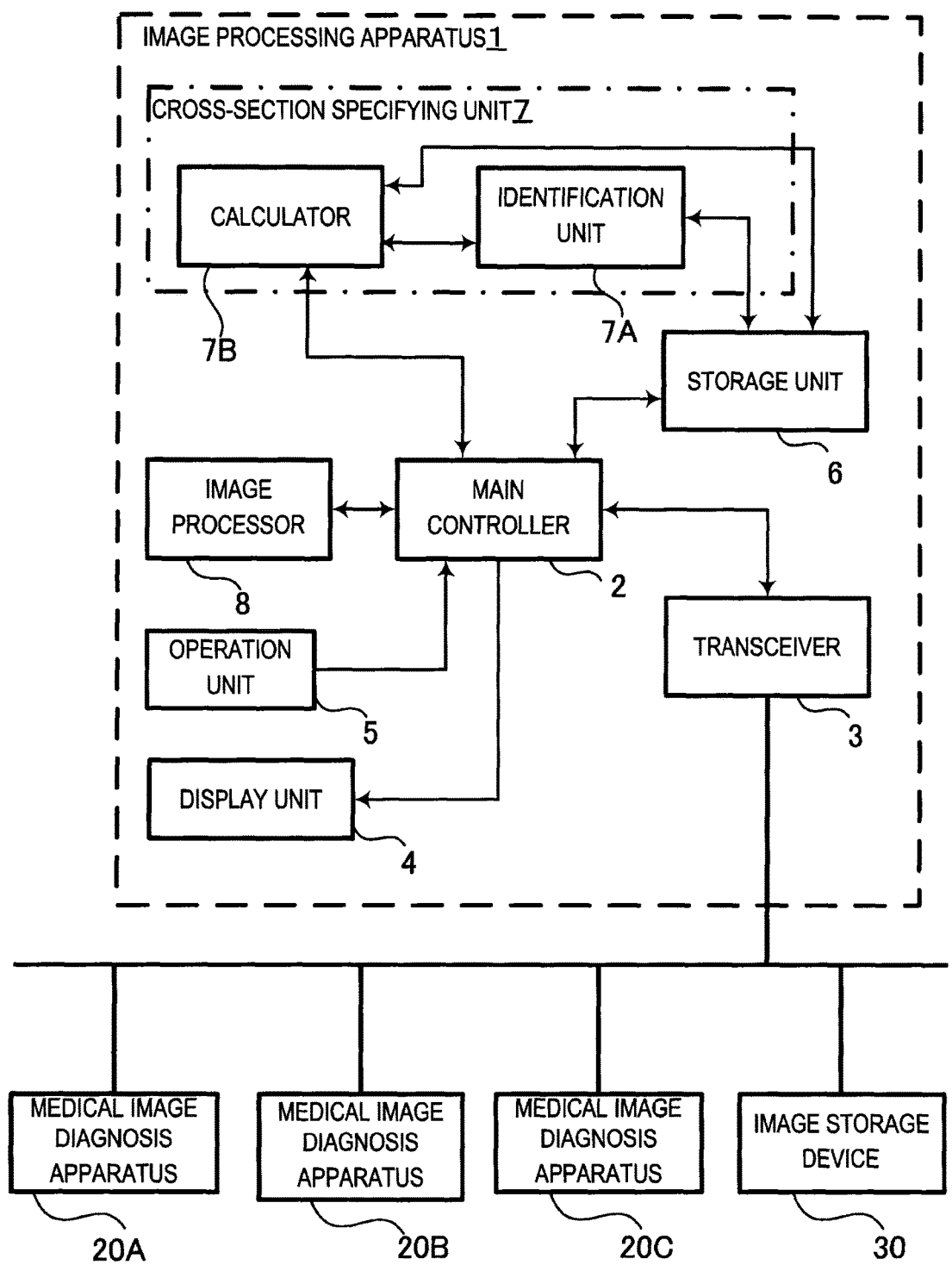
FIG. 1 is a schematic block diagram of an image processing apparatus according to a first embodiment.
Figure 2:
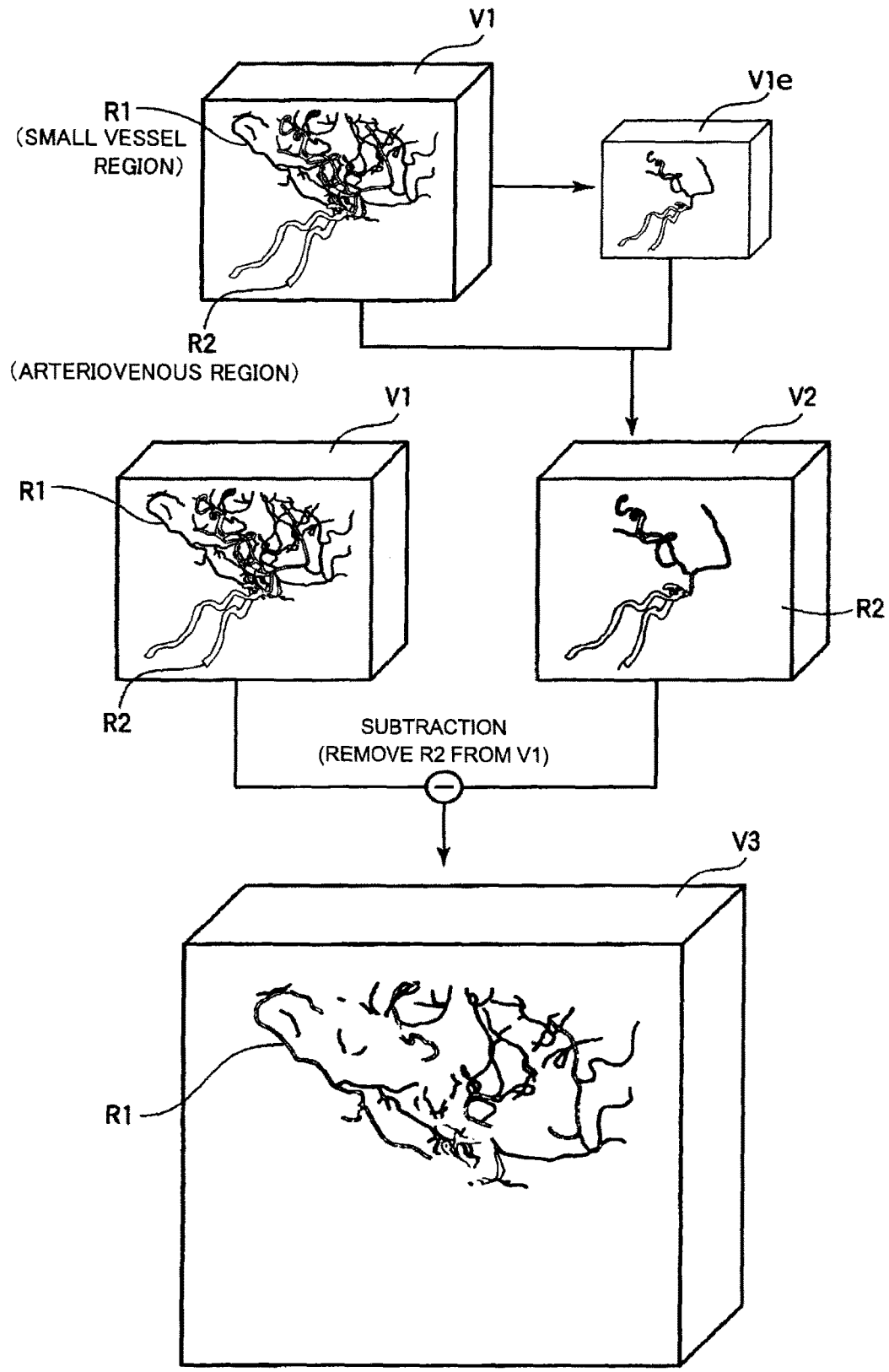
FIG. 2 is a conceptual diagram for explaining the operation of the image processing apparatus of the first embodiment.
Figure 3:
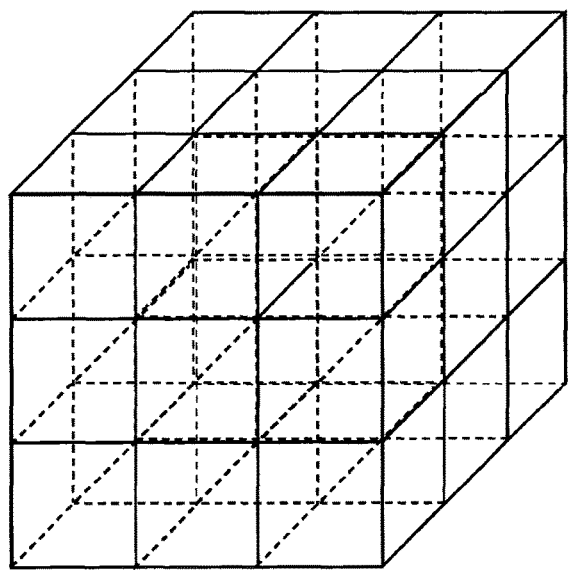
FIG. 3 is a schematic diagram of peripheral pixels of the first embodiment.

Referring to FIGS. 1 to 3, a description is given of the configuration of an image processing apparatus 1 according to the first embodiment. FIG. 1 is a schematic block diagram of the image processing apparatus 1 of the first embodiment. A medical image workstation is described as an example of the image processing apparatus 1 of the first embodiment. In the first embodiment, the image processing apparatus 1 identifies a predetermined region (organ, etc.) in medical image data. In the following, an example is described in which the image processing apparatus 1 identifies a small diameter blood vessel as the predetermined region in volume data as the medical image data (see "identification unit 7A" described below). The image processing apparatus 1 projects the small diameter blood vessel on three orthogonal cross-sections in the volume data. The image processing apparatus 1 obtains one with a least energy from the three orthogonal cross-sections where the small diameter blood vessel has been projected as a cross-section corresponding to the running direction of the blood vessel (see "calculator 7B" described below). The image processing apparatus 1 performs noise reduction on the volume data along the cross-section thus obtained (see "image processor 8" described below).

In the first embodiment, the volume data is generated by any one of medical image diagnosis apparatuses (20A to 20C) in advance, and stored in an image storage device 30. The image processing apparatus 1 acquires the volume data from the image storage device 30. For another example, the image processing apparatus may be included in a medical image diagnosis apparatus (see FIG. 6) that performs collection of information on the body tissues of a subject, reconstruction, and generation of volume data as in the second embodiment described below.

(General Structure of Image Processing Apparatus and External Device)

As illustrated in FIG. 1, the image processing apparatus 1 of the first embodiment includes a main controller 2, a transceiver 3, a display unit 4, an operation unit 5, a storage unit 6, a cross-section specifying unit 7, and the image processor 8. The image processing apparatus 1 is connected to a plurality of medical image diagnosis apparatuses 20A, 20B, 20C, ..., and 20n via a network. The image processing apparatus 1 is also connected to the image storage device 30 through the network. The image processing apparatus 1 acquires volume data from the image storage device 30 or the like through the transceiver 3 according to an indication signal from the main controller 2. Although FIG. 1 illustrates the medical image diagnosis apparatuses 20A, 20B, 20C, and the image storage device 30 connected to the network as an example, the number of the devices can be set arbitrarily. Incidentally, in the following examples, the medical image diagnosis apparatus 20A and the like collect information on the body tissues of a subject. The medical image diagnosis apparatuses 20A to 20C may be, for example, X-ray diagnosis apparatuses, X-ray CT systems, MRI equipment, and ultrasound diagnosis apparatuses.

The image storage device 30 is, for example, based on picture archiving and communication system (PACS). For example, the image storage device 30 is an image management apparatus that has an image database. The image management apparatus manages medical image data in the image database according to a program. For another example, the image storage device 30 may be a file server that stores medical image data, such as a network attached storage (NAS).

<Controller>

The main controller 2 controls each unit of the image processing apparatus 1. For example, the main controller 2 sends volume data together with analytical software for analyzing the volume data to the main memory, and controls each unit to perform a series of processes related to noise reduction described below. Besides, the main controller 2 receives an operation signal from the operation unit 5, and requests for the acquisition of volume data from the image storage device 30. The main controller 2 also controls the display of medical images on the display unit 4.

<Transceiver>

The transceiver 3 is an interface for exchanging volume data with the medical image diagnosis apparatuses 20A, 20B, 20C, or the image storage device 30.

<Display Unit>

The display unit 4 includes an arbitrary display device such as a cathode ray tube (CRT), a liquid crystal display (LCD), an organic electro-luminescence display (OELD), and a field emission display (FED). The display unit 4 displays various types of screens and images (X-ray images, etc.) under the control of the main controller 2.

<Operation Unit>

The operation unit 5 includes operation devices and input devices of arbitrary form, such as a keyboard, a mouse, a trackball, a joystick, and a control panel. The operation unit 5 outputs an operation signal based on operation performed thereon, and sends it to the main controller 2. The main controller 2 performs control and operation according to the operation signal.

<Storage Unit>

The storage unit 6 includes an arbitrary storage medium such as a hard disk drive (HDD) and a solid state drive (SSD). The storage unit 6 stores the analytical software, volume data received from the image storage device 30 and the like, a program for implementing each function of the image processing apparatus, and the like. Incidentally, the storage unit 6 may not necessarily store the volume data, and the volume data may be temporarily stored in the main memory of the main controller 2 or the like.

<Cross-Section Specifying Unit>

The cross-section specifying unit 7 includes the identification unit 7A that identifies region (organ, etc.) of interest, and the calculator 7B that obtains a cross-section corresponding to the running direction indicated by pixels of the region identified. Described below are the identification unit 7A and the calculator 7B.

<Identification Unit 7A>

<<Specify Small Diameter Region—Outline>>

First, a description is given of the outline of a series of operations of the identification unit 7A. When the main controller 2 feeds the main memory with volume data and the analytical software, the identification unit 7A specifies a fine structure in a region of interest. If the region of interest is a blood vessel, the identification unit 7A specifies a small diameter portion of the blood vessel. For example, the identification unit 7A reduces the volume data, and expands it afterwards.

In the following, with reference to FIGS. 2 and 3, a description is given of the process of specifying a region having a fine structure that is an object of the cross-section specifying process. FIG. 2 is a conceptual diagram for explaining the outline of the operation of the image processing apparatus 1 of the first embodiment. FIG. 3 is a schematic diagram illustrating the concept of the range of peripheral pixels. Preceding the description of the process, each volume data (V1 to V3) and a blood vessel region (R1, R2) contained in the volume data are explained.

FIG. 2 conceptually illustrates unprocessed volume data V1 that contains an arteriovenous region R2 and a small vessel region R1 such as perforators. The small vessel region R1 is a group of connected regions. While an artery region and a venous region are generally not connected to each other, they are represented by a single reference letter in FIG. 2 for simplicity of the description.

In addition, FIG. 2 conceptually illustrates processed volume data V2 after removal of the small vessel region R1 by a reduction process (e.g., erosion). FIG. 2 also illustrates difference volume data V3 indicating the difference between the unprocessed volume data V1 and the processed volume data V2. Note that FIG. 2 illustrates an example of the process of specifying a small diameter blood vessel performed by the identification unit 7A.

<<Specify Small Diameter Vessel—Reduction Process>>

As illustrated in FIG. 2, the identification unit 7A performs a reduction process on the unprocessed volume data V1 to remove a small diameter blood vessel, and thereby generates reduced volume data V1e. That is, in the unprocessed volume data V1, each of the connected regions that constitute the small vessel region R1 is minute compared to the diameter of the arteriovenous region R2. Accordingly, if the identification unit 7A reduces the unprocessed volume data V1, the small vessel region R1 is removed by other pixels because of its minuteness.

As a specific example is cited the case where the unprocessed volume data V1 is formed of 512×512×512 voxels in X Y and Z directions. In this example, the identification unit 7A averages groups of 2×2×2 voxels in the unprocessed volume data V1 to obtain a voxel in the reduced volume data. With this, the unprocessed volume data V1 is reduced into a size of 256×256×256 voxels. Here, the range to be averaged is not limited to 2×2×2 voxels, and can be set depending on the number of voxels contained in the unprocessed volume data V1, the size of a blood vessel to be specified, and the like. The range may be changed by the analytical software or an instruction from an operator depending on a region of a subject's body indicated by the volume data.

While the reduction process is described above as being performed once, the identification unit 7A may perform the reduction process twice or more times. More specifically, the identification unit 7A may reduce the unprocessed volume data V1 of 512×512×512 voxels into 256×256×256 voxels, and then further reduce the data into a size of 128×128×128 voxels. Through a plurality of times of the reduction process, even if a blood vessel having a predetermined diameter is not removed by the first reduction process, it can be removed by the second or the following reduction process. For example, the number of times of the reduction process may be increased by operation. By performing the reduction process twice or more times in this manner, the identification unit 7A can adjust the diameter of a blood vessel to be removed.

<<Specify Small Diameter Vessel—Expansion Process>>

The identification unit 7A obtains the processed volume data V2 that does not contain the small vessel region R1 after an expansion process based on the unprocessed volume data V1 and the reduced volume data V1e. For a specific example, with respect to a voxel indicating a value at a blood vessel level or higher in the unprocessed volume data V1, the identification unit 7A identifies a corresponding position in the reduced volume data V1e. In the reduced volume data V1e, if there is no voxel indicating a value at a blood vessel level or higher in the identified voxel or voxels around it in the reduced volume data Vie (see FIG. 3), the identification unit 7A uses the voxel value of a position identified in the reduced volume data V1e as the voxel value of the processed volume data V2. If there is a voxel indicating a value at a blood vessel level or higher, the voxel value of the unprocessed volume data V1 is used as the voxel value of the processed volume data V2. This process is performed on all voxels of the processed volume data V2.

<<Specify Small Diameter Vessel—Blood Vessel Identification>>

The identification unit 7A performs threshold processing on the unprocessed volume data V1 and the processed volume data V2 to extract blood vessels from them.

<<Specify Small Diameter Vessel—Subtraction Process>>

The identification unit 7A subtracts the arteriovenous region R2 extracted from the processed volume data V2 from the small vessel region R1 and the arteriovenous region R2 extracted from the unprocessed volume data V1. This process generates the difference volume data V3 in which the small vessel region R1 is extracted. As described above, the identification unit 7A extracts a small diameter blood vessel from the volume data. While an example is described above in which a blood vessel is extracted by threshold processing on voxel values, the blood vessel may be extracted based on the continuity of the blood vessel and voxel values.

<Calculator 7B>

Described below is the outline of a series of operations of the calculator 7B. When the identification unit 7A has identified a region having a fine structure such as a small diameter blood vessel, the calculator 7B identifies a cross-section to apply noise reduction to in the following manner.

<<Project Blood Vessel in Cross-Section>>

First, the calculator 7B projects the identified small diameter blood vessel in a plurality of cross-sections in different directions in the volume data. As examples of the cross-sections may be cited three orthogonal cross-sections. The cross-sections on which the calculator 7B projects a blood vessel are not limited to the three orthogonal cross-sections; however, the three orthogonal cross-sections are described below by way of example for convenience of description.

The three orthogonal cross-sections are, for example, an axial plane, a coronal plane, and a sagittal plane. In volume data that indicates human tissues, the axial plane is a cross-section perpendicular to the body axis direction. The coronal plane is a cross-section parallel to the body axis direction and dividing the human body into front (anterior) and back (posterior) portions. The sagittal plane is a cross-section dividing the human body into left and right halves, and perpendicular to the axial plane and the coronal plane.

<<Calculate Energy of Cross-Section>>

Next, the calculator 7B obtains the energy of a portion corresponding to the small diameter blood vessel in the three orthogonal cross-sections. For example, the calculator 7B obtains the energy using the following formula (2):

$$E=\iint_{u,v} p(u,v)^2 du dv \qquad (2)$$

where p (u, v) indicates projection on each orthogonal cross-sections, and (u,v) represents the position of the cross-sections.

The calculator 7B compares energies in the cross-sections, and thereby obtains the size of the energies. The identification unit 7A has extracted the small diameter blood vessel before this comparison, and the small diameter blood vessel has already been projected in the three orthogonal cross-sections. If the volume data is of the head, the axial plane is substantially perpendicular to the running direction of the small diameter blood vessel like a perforator extracted. Accordingly, the energy is large in the portion of the small diameter blood vessel projected on the axial plane.

Therefore, not to perform noise reduction on a cross-section perpendicular to the running direction of the small diameter blood vessel, the calculator 7B of this embodiment specifies a cross-section with the least energy from among the cross-sections for which energy has been obtained.

<<Calculate Area of Cross-Sections>>

While described above as being configured to obtain energy in each of the cross-sections, the calculator 7B of this embodiment is not so limited. For example, the calculator 7B may obtain the area of the small diameter blood vessel projected on each of the three orthogonal cross-sections. If the volume data is of the head, the axial plane is substantially perpendicular to the running direction of the small diameter blood vessel like a perforator extracted. Accordingly, the area of the portion of the small diameter blood vessel projected on the axial plane is likely to be small. Therefore, not to perform noise reduction on a cross-section perpendicular to the running direction of the small diameter blood vessel, the calculator 7B of a modification specifies a cross-section with the largest area among the cross-sections for which energy has been obtained.

<Image Processor 8>

The image processor 8 determines the cross-section (direction) specified by the calculator 7B as an object to apply noise reduction to. The image processor 8 performs noise reduction on the cross-section by smoothing as explained above with formula (1). Alternatively, the image processor 8 performs noise reduction by, for example, using a coherent filter. The outline of the coherent filter is described below.

With respect to each pixel (pixel of interest) in the cross-section of interest, the image processor 8 obtains matching rate to the peripheral pixels, i.e., whether it is similar to the peripheral pixels, according to settings. The image processor 8 changes the filter coefficient of the coherent filter according to the matching rate. For example, as the matching rate increases, the image processor 8 makes the filter coefficient larger. In the same manner, as the matching rate decreases, the image processor 8 makes the filter coefficient smaller. Incidentally, if each of the three orthogonal cross-sections is formed of 512×512 pixels, a range of 11×11 pixels around the pixel of interest are an example of the peripheral pixels. In the following, the concept of the coherent filter is described below.

The image processor 8 quantifies the matching rate between the pixel value (vector value, scalar value) of each pixel that constitutes the cross-section of interest and pixel values of others (peripheral pixels). The image processor 8 obtains by threshold processing the level of matching rate between the peripheral pixels and the pixel of interest quantified. Alternatively, the image processor 8 determines whether the matching rate belongs to one of a plurality of levels of numerical ranges set in advance. The image processor 8 uses the pixel value of the peripheral pixels as that of the pixel of interest. On this occasion, if the matching rate is high, the image processor 8 increases the contribution ratio of the peripheral pixels. In the same way, if the matching rate is low, the image processor 8 reduces the contribution ratio of the peripheral pixels. For another example, the image processor 8 determines the contribution ratio of the peripheral pixels according to the numerical range to which the matching rate belongs.

As a specific example, the image processor 8 applies a weighting function, i.e., the function of the matching rate between the pixel of interest and the peripheral pixels to a matching rate obtained for the pixel value of each of the peripheral pixels. The image processor 8 thus determines the weight of the pixel value of each of the peripheral pixels. The image processor 8 calculates the weighted average of the pixel values of the peripheral pixels using the weight. If the matching rate is high between the pixel of interest and the peripheral pixels, the image processor 8 increases the weight of the peripheral pixels. In this manner, the image processor 8 increases the contribution ratio of the pixel values of the peripheral pixels in the weighted average, and thereby forms the pixel value of the pixel of interest. On the other hand, if the matching rate is low, the image processor 8 reduces the weight of the peripheral pixels. With this, the image processor 8 reduces the contribution ratio of the pixel values of the peripheral pixels in the weighted average, and thereby forms the pixel value of the pixel of interest. In this process, the image processor 8 forms the pixel value of the pixel of interest as emphasizing the peripheral pixels determined to be "similar" to the pixel of interest. Consequently, a decrease in spatial resolution can be reduced. In one example, the weighting function is a non-negative monotonically increasing function related to the matching rate.

In this embodiment, the matching rate may be quantified based on a risk rate obtained by applying a statistical test to a scalar value that forms one pixel value and other pixel values. Incidentally, the "statistical test" as used herein may be, for example, "Chi-squared test". Besides, in general, the relationship between the matching rate and the risk rate introduced herein includes the case where as one increases the other decreases. That is, upon forming a new pixel value, as the risk rate increases (the matching rate decreases), weight for other pixels reduces (contribution to a new pixel value to be formed reduces). On the other hand, as the risk rate decreases (the matching rate increases), weight for other pixels increases (contribution to a new pixel value to be formed increases).

In a statistical test, if it is determined that "statistically there is no significant difference (=the matching rate is high), it is determined that the similarity is likely to be high. On the other hand, if it is determined that "statistically there is a significant difference (=the matching rate is low), it is determined that the similarity is low.

While the coherent filter is described above as an example, the image processor 8 may perform noise reduction by using an anisotropic diffusion filter. With the anisotropic diffusion filter, it is possible to use adaptively weighted anisotropic diffusion (AWAD). The AWAD is effective in that noise is reduced while the structure of related body tissues in various sizes or an edge around the structure is maintained.

(Operation)

Figure 4:
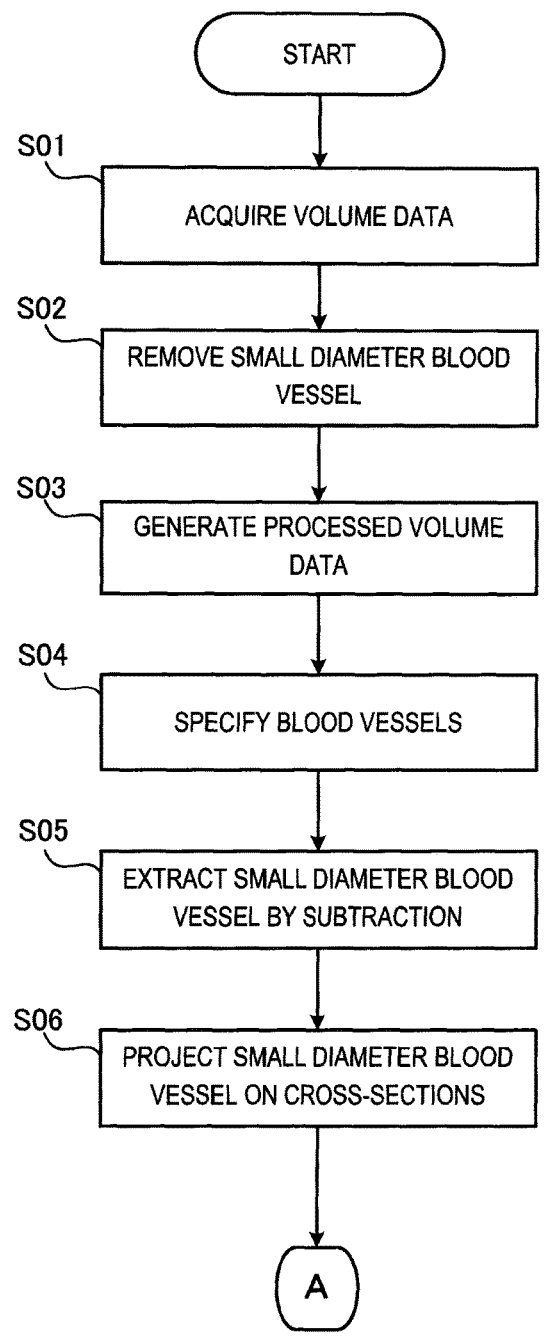
FIG. 4 is a flowchart of noise reduction process performed by the image processing apparatus of the first embodiment.
Figure 5:
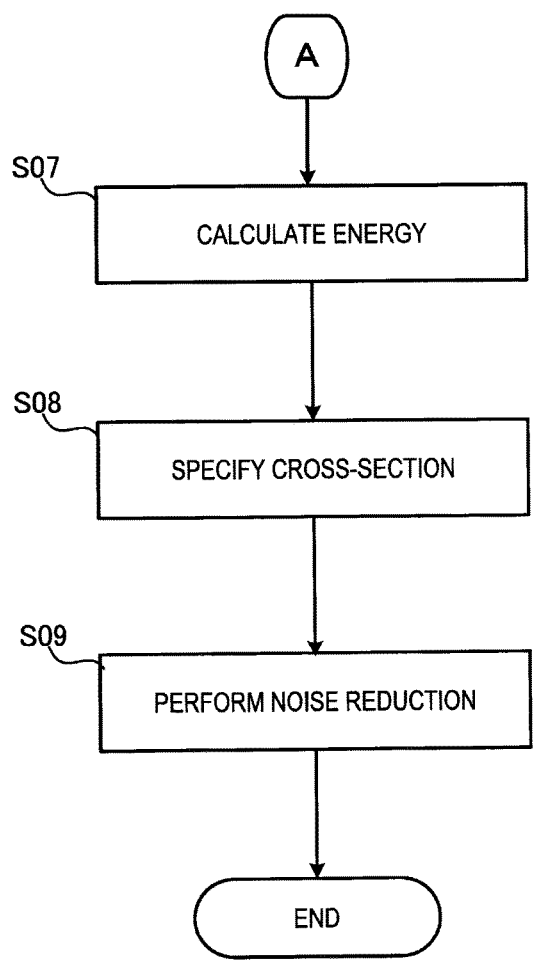
FIG. 5 is a flowchart of noise reduction process performed by the image processing apparatus of the first embodiment.

In the following, a description is given of the outline of the operation of the image processing apparatus 1 of the first embodiment with reference to FIGS. 4 and 5. FIGS. 4 and 5 are flowcharts of noise reduction process performed by the image processing apparatus 1 of the first embodiment.

<Step S01>

An operator such as a doctor or the like inputs identification information for identifying volume data and the like using the operation unit 5 of the image processing apparatus 1. Examples of the identification information include image ID, patient ID, and examination ID. The main controller sends the identification information and the like to an external device (the image storage device 30, etc.) that stores the volume data of interest through the transceiver 3. Upon receipt of the identification information, the external device such as the image storage device 30 sends the volume data to the image processing apparatus 1. The main controller 2 of the image processing apparatus 1 stores the volume data in the storage unit 6 or the like.

<Step S02>

The main controller 2 feeds the main memory with analytical software and the volume data stored in step S01. The identification unit 7A performs a reduction process on the unprocessed volume data V1, and generates the unprocessed volume data V1 from which a small diameter blood vessel have been removed.

<Step S03>

The identification unit 7A performs an expansion process on the reduced unprocessed volume data V1, and generates the processed volume data V2 that does not contain the small vessel region R1 (see FIG. 2).

<Step S04>

Having generated the processed volume data V2 (step S03), the identification unit 7A performs, for example, threshold processing based on pixel values and the like to identify blood vessels and the like in each volume data (V1, V2). By identifying voxels that indicate a blood vessel, the blood vessel is identified in the unprocessed volume data V1 and the processed volume data V2.

<Step S05>

The identification unit 7A subtracts the arteriovenous region R2 extracted from the processed volume data V2 from the small vessel region R1 and the arteriovenous region R2 extracted from the unprocessed volume data V1. This process generates the difference volume data V3. The identification unit 7A extracts the small diameter blood vessel from the volume data with this process.

<Step S06>

After the identification unit 7A has extracted the small diameter blood vessel (step S05), the calculator 7B projects the small diameter blood vessel on the axial plane, the coronal plane, and the sagittal plane in the volume data.

<Step S07>

When the small diameter blood vessel has been projected on the three orthogonal cross-sections (step S06), the calculator 7B obtains the energy of a portion corresponding to the small diameter blood vessel in the three orthogonal cross-sections.

<Step S08>

Next, the calculator 7B compares the energies of portions each corresponding to the small diameter blood vessel in the cross-sections. With this, the calculator 7B specifies a cross-section with the least energy from among the cross-sections for which energy has been obtained.

<Step S09>

The image processor 8 determines the cross-section specified by the calculator 7B as an object to apply noise reduction to. The image processor 8 performs noise reduction on the cross-section determined.

The identification unit 7A may perform the reduction process a plurality of times. With this, even if a blood vessel having a predetermined diameter is not removed by the first reduction process, it can be removed by the second or the following reduction process. Thus, the diameter of a blood vessel to be removed can be adjusted.

Steps S02 and S03, and step S04 may be performed in the reverse order. More specifically, steps S02 and S03 may be performed on the unprocessed volume data V1 after blood vessels and the like are identified by threshold processing.

According to the first embodiment, the image processing apparatus 1 specifies an object of interest having a fine structure (a small diameter blood vessel, etc.) in volume data. The image processing apparatus 1 projects the object of interest on a plurality of cross-sections in different directions in the volume data. From among the cross-sections on which the object has been projected, the image processing apparatus 1 determines a cross-section with the least energy (or a cross-section in which the area of a portion of the object is the largest). The image processing apparatus 1 obtains the cross-section with the least energy (or the largest portion of the object) as a cross-section corresponding to the running direction of the small diameter blood vessel. The image processing apparatus 1 performs noise reduction along the cross-section.

With this configuration, it is possible to avoid the loss of an object of interest and a decrease in the resolution of the object of interest due to noise reduction using peripheral pixels. Thus, a decrease in the visibility of the object can be prevented in an image based on volume data after noise reduction.

Besides, the image processing apparatus 1 of the first embodiment is configured to specify a fine structure such as a small diameter blood vessel and the like through the reduction of medical image data. This configuration simplifies the operation required to specify such region, and thus prevents heavy load on a processor such as CPU. Reduction in the load of a processor such as CPU makes it possible to avoid a situation where the display of images of a region of interest is slow in an emergency. For example, even when the operator of the image processing apparatus 1 does not have enough time to select a region to be acquired or set a acquisition program for each region in an emergency, the image processing apparatus 1 can prevent a decrease in the visibility of a fine structure in medical image data while performing noise reduction on the medical image data.

Second Embodiment

In the following, a description is given of the image processing apparatus 1 according to the second embodiment.

Figure 6:
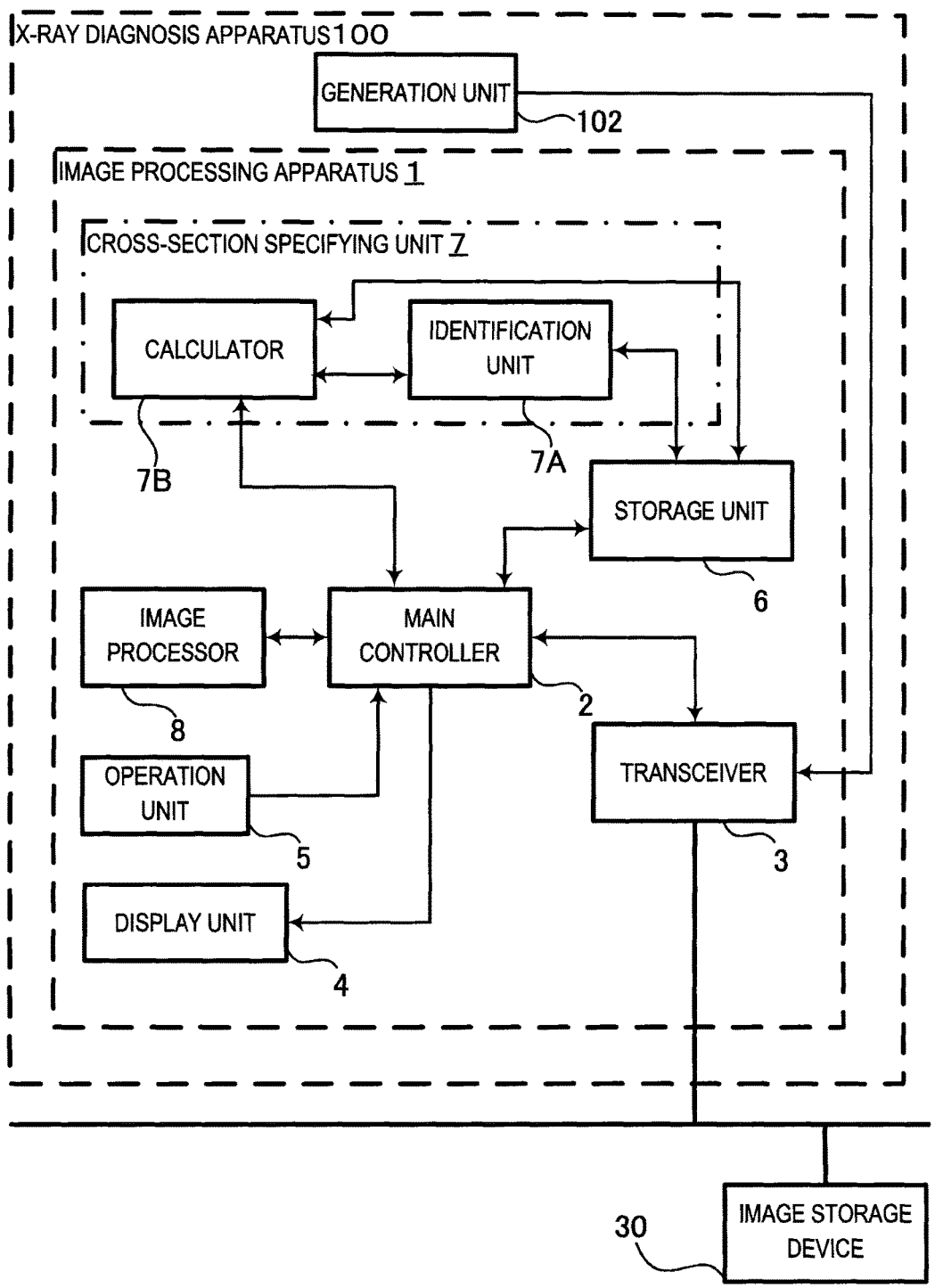
FIG. 6 is a schematic block diagram of an X-ray diagnosis apparatus according to a second embodiment.
Figure 7A:
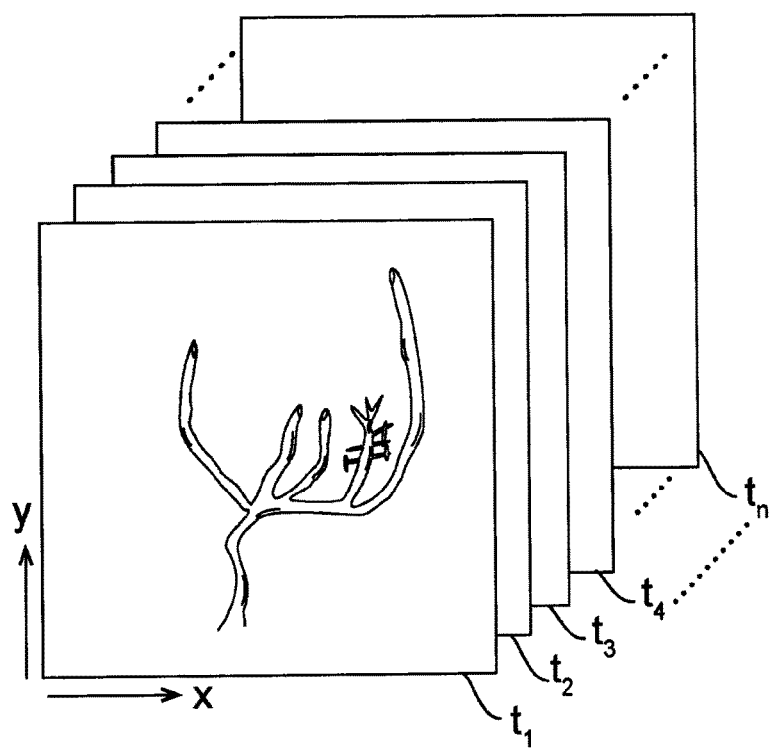
FIG. 7A is a schematic diagram illustrating a relationship among frames acquired over time.
Figure 7B:
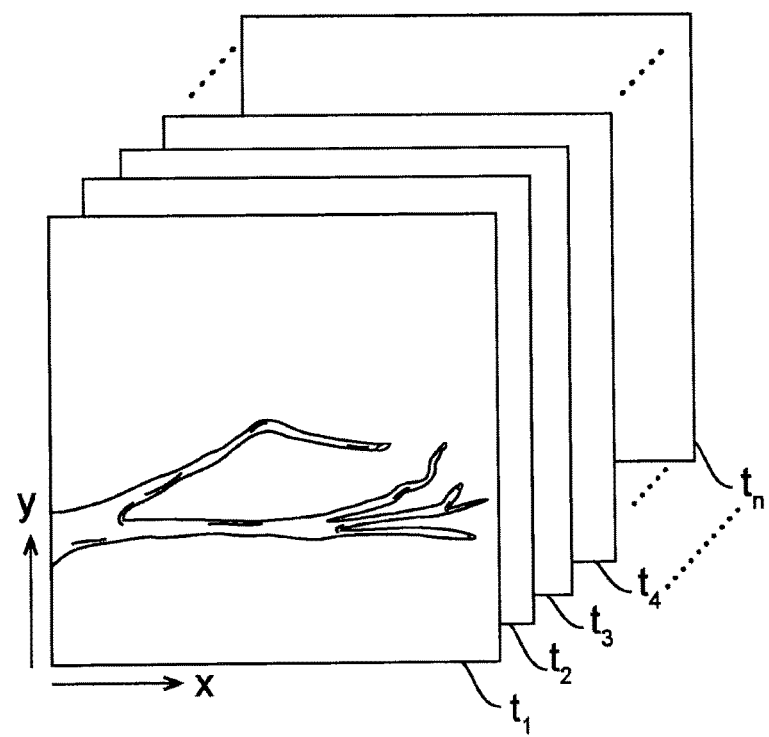
FIG. 7B is a schematic diagram illustrating a relationship among frames acquired over time.

FIG. 6 is a schematic block diagram of an X-ray diagnosis apparatus 100 according to the second embodiment. FIGS. 7A and 7B are schematic diagrams illustrating a relationship among frames $t_1$ to $t_n$ acquired over time. FIG. 7A illustrates a group of images of the head. FIG. 7B illustrates a group of images of the abdomen.

In the first embodiment described above, the image processing apparatus 1 is configured to specify a small diameter region in a region of interest in volume data as medical image data. On the other hand, in the second embodiment, noise reduction may be performed on a moving image. The image processing apparatus 1 of the second embodiment basically has a similar structure to that of the first embodiment, and the main controller 2, the transceiver 3, the display unit 4, the operation unit 5 and the storage unit 6 are of the same structure as described in the first embodiment. Therefore, the same description is not repeated.

<Outline>

Described below is the outline of the second embodiment. The identification unit 7A of the image processing apparatus 1 specifies a small diameter region in each of a plurality of frames (X-ray moving image, etc.) generated over time. FIGS. 7A and 7B schematically illustrate examples of the plurality of frames $t_1$ to $t_n$.

In the second embodiment, medical image data is acquired by, for example, continuously or intermittently scanning the same region of the subject's body. The frames $t_1$ to $t_n$ in the medical image data are each a two-dimensional image. As described in the first embodiment, in volume data, it is possible to define a plurality of cross-sections in different directions at a certain time. In contrast, a plurality of cross-sections in different directions cannot be defined in a moving image or the like including a plurality of two-dimensional images acquired over time. Accordingly, in the second embodiment, frame plane, frame horizontal axis (X direction in FIGS. 7A and 7B) and time axis, and frame vertical axis (Y direction in FIGS. 7A and 7B) and time axis are considered as three cross-sections.

The image processing apparatus 1 of the second embodiment extracts an object of interest (a small diameter blood vessel or a device such as a guide wire, etc.) having a small diameter region from the frames $t_1$ to $t_n$. The image processing apparatus 1 projects the object of interest on the frame horizontal and vertical axes, and obtains the energy of projection data (or the area of the portion of the object). The image processing apparatus 1 controls noise reduction based on the result of the comparison of obtained values. For example, when performing noise reduction on a plurality of cross-sections, the image processing apparatus 1 determines cross-sections to apply noise reduction to and the order.

Incidentally, the image processing apparatus 1 of the second embodiment may be included in a medical image diagnosis apparatus such as an X-ray diagnosis apparatus. In the following, the image processing apparatus 1 is described as being included in the X-ray diagnosis apparatus 100 with reference to FIG. 6. In the X-ray diagnosis apparatus 100, for example, an object or a region to be observed in the subject's body is fixed and acquired with fluoroscopic radiography. As a result of fluoroscopy, X rays that have passed through the object to be observed in the subject's body are detected, and a generation unit 102 generates the frames $t_1$ to $t_n$ that constitute an X ray moving image in different time phases on a predetermined time axis.

The generation unit 102 sends the frames to the transceiver 3. The main controller 2 sends the frames received by the transceiver 3 to the cross-section specifying unit 7.

<Identification Unit 7A>

<<Specify Small Diameter Region>>

As illustrated in FIGS. 7A and 7B, in the second embodiment, noise reduction is performed not on volume data but on a group of frames ($t_1$ to $t_n$) acquired over time. Accordingly, the identification unit 7A specifies a small diameter region (a small diameter blood vessel or a device such as a guide wire, etc.) in each of the frames $t_1$ to $t_n$. For example, the identification unit 7A performs this process in parallel with acquiring frames. Note that in the process of specifying a small diameter region in the second embodiment, the process of the first embodiment is two-dimensionally performed (reduction process, etc.).

<<Extract Blood Vessel>>

In the second embodiment, the identification unit 7A extracts blood vessels by performing threshold processing in the same manner as in the first embodiment. However, the extraction of blood vessels is not necessarily performed in the same process as in the first embodiment. For example, the identification unit 7A may extract blood vessels using digital subtraction angiography (DSA).

For example, the identification unit 7A performs subtraction between an unenhanced X-ray image (mask image) and an enhanced X-ray image (contrast image), thereby generating a DSA (blood vessel enhanced) image. If the region to be observed is an area of the heart, the X-ray diagnosis apparatus 100 acquires electrocardiogram (ECG) waveforms from an external device (electrocardiograph), and performs ECG-gated scanning in a predetermined cardiac time phase based on the ECG wave forms. As a result, the frames $t_1$ to $t_n$ that constitute an X-ray moving image are generated. In the case of an X-ray moving image of the heart with no mask image, the identification unit 7A may perform subtraction using a blur image instead of a mask image. That is, the identification unit 7A averages, for example, by 5×5 pixels, the frames of an X-ray image generated by the generation unit 102, and generates a blur image of the X-ray image. The identification unit 7A performs subtraction between the blur image and an original image. Thus, the identification unit 7A generates an image where blood vessels are extracted.

As described above, in the second embodiment, blood vessels may be extracted as a result of subtraction performed by the identification unit 7A.

<<Calculate Energy>>

After a small diameter blood vessel is extracted from the frames of the X-ray image, the calculator 7B projects the small diameter blood vessel on the three cross-sections, and obtains energy of a portion corresponding to the small diameter blood vessel in projection data. The energy may be obtained in the same manner as in the first embodiment.

<<Calculate Area>>

The calculator 7B of the second embodiment need not necessarily obtain the energy of the projection data as described above. In other words, the calculator 7B may be configured to obtain the area of the small diameter blood vessel as in the first embodiment. The area may be obtained in the same manner as in the first embodiment.

<Image Processor 8>

The image processor 8 controls noise reduction on the frames based on the energy obtained for the frames of the X-ray image. For example, the image processor 8 compares energies or areas obtained in directions of projection on the three cross-sections. The image processor 8 controls noise reduction according to the result of the comparison. The image processor 8 determines order of the cross-sections based on the result of the comparison.

<<Control Example 1>>

First, the image processor 8 performs noise reduction on one of the cross-sections which has the least energy. Note that the noise reduction may be the same as that of the first embodiment.

<<Control Example 2>>

The image processor 8 determines a cross-section to apply noise reduction to next according to the value of the energy or the area obtained, and performs noise reduction along the cross-section.

<<Noise Reduction on Real-Time Image>>

Next, with reference to FIGS. 7A and 7B, a description is given of noise reduction performed on a real-time image in the second embodiment.

In post-processing, noise reduction is applied to the frames $t_1$ to $t_n$ of an X-ray image in different time phases generated in advance. In this application, noise reduction is performed in the same manner as in the first embodiment except that the time axis is assumed to be one of three axes of volume data.

On the other hand, noise reduction for a real-time image, which is applied to a cross-section including the time axis, is explained in the examples of FIGS. 7A and 7B as follows. That is, when noise reduction is performed on a frame $t_{11}$ with 11×11 pixels as a look-up range for the matching rate, noise reduction is performed using the frame to be processed and also the frames $t_1$ to $t_{10}$ acquired before the frame.

To clarify the difference between noise reduction performed on a real-time image and that performed on others, they are compared as to a region where the matching rate is calculated and the look-up range for the matching rate. When noise reduction is applied to an image other than X-ray images displayed in real time, the matching rate is calculated with respect to, for example, a region of 3×3 pixels or voxels centered at a pixel or voxel of interest. For example, a region of 11×11 pixels or voxels centered at the pixel or voxel of interest is used as the look-up range for the matching rate. On the other hand, when noise reduction is applied to a cross-section, which contains the time axis, of an X-ray image displayed in real time, the matching rate is calculated with respect to a region of 3×3 pixels $t_9$ to $t_{11}$ including a pixel of interest and pixels adjacent to the pixel of interest (when noise reduction is performed in the frame vertical axis direction, pixels vertically adjacent to the pixel of interest). A region of 11×11 pixels $t_1$ to $t_{11}$ including the pixel of interest and 5 pixels adjacent to the pixel of interest (when noise reduction is performed in the frame vertical axis direction, 5 pixels vertically adjacent to the pixel of interest) is used as the look-up range for the matching rate.

(Operation)

Figure 8:
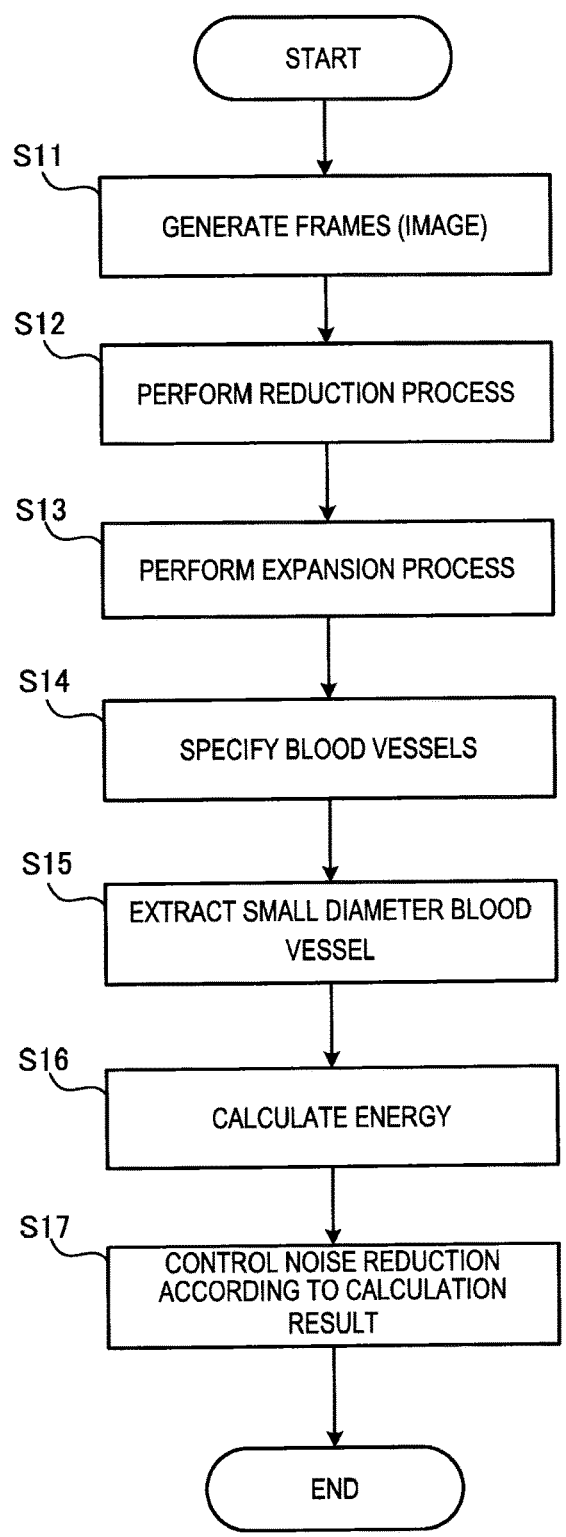
FIG. 8 is a flowchart of the operation of an image processing apparatus of the second embodiment.

In the following, a description is given of the outline of the operation of the image processing apparatus 1 of the second embodiment with reference to FIG. 8. FIG. 8 is a flowchart of noise reduction process performed by the image processing apparatus 1 of the second embodiment.

<Step S11>

In the X-ray diagnosis apparatus 100, the generation unit 102 generates frames that constitute an X-ray moving image by continuously or intermittently scanning the same region of the subject's body. The generation unit 102 sends the frames to the transceiver 3. The main controller 2 sends the frames received by the transceiver 3 to the cross-section specifying unit 7.

<Steps S12 to S14>

As in steps S02 to S04, the identification unit 7A performs the processes to specify a small diameter region (a small diameter blood vessel). If blood vessels are extracted by DSA in step S15, step S14 of specifying a blood vessel is not necessary.

<Step S15>

The identification unit 7A extracts blood vessels by the same threshold processing as in the first embodiment or using DSA.

<Step S16>

After the identification unit 7A has extracted a small diameter blood vessel, the calculator 7B projects the small diameter blood vessel on the three cross-sections, and obtains the energy or area of projection data.

<Step S17>

The image processor 8 performs noise reduction while exerting controls as described above as the control examples 1 and 2, alone or in combination, based on the energy or area of the projection data obtained by the calculator 7B.

According to the second embodiment, the image processing apparatus 1 specifies an object of interest having a fine structure such as a small diameter blood vessel or the like in each frame of an X-ray moving image. The image processing apparatus 1 obtains the energy of projection data of the small diameter blood vessel or the like (or the area of the portion of the object). The image processing apparatus 1 controls noise reduction based on the obtained values.

With this configuration, it is possible to avoid the loss of an object of interest and a decrease in the resolution of the object of interest due to noise reduction using peripheral pixels. Thus, a decrease in the visibility of the object can be prevented in an X-ray image after noise reduction.

Third Embodiment

In the following, a description is given of the image processing apparatus 1 according to the third embodiment. In the first and the second embodiments, medical image data is reduced to extract an object of interest having a fine structure. In the third embodiment, the image processing apparatus 1 obtains the diameter of a blood vessel while tracking the blood vessel by a search of a region of interest as well as a thinning process and the like. The image processing apparatus 1 compares the obtained diameter with a threshold to specify a portion having a diameter equal to or less than the threshold. In the third embodiment, a small diameter blood vessel is specified in this manner.

<Identification Unit 7A>

<<Identify Blood Vessel>>

The identification unit 7A performs threshold processing on volume data or frame images of an X-ray moving image, and thereby extracts blood vessels from the data. The extraction is performed in the following manner.

Upon receipt of volume data, the identification unit 7A identifies a blood vessel or the like in the volume data based on, for example, the pixel value and the transparency. Specifically, the identification unit 7A retrieves, from the storage unit 6 or the like, a threshold and a setting range for the pixel value and/or the transparency corresponding to the blood vessel or the like in the volume data. The identification unit 7A may identify the blood vessel or the like based on the information. As voxels indicating the blood vessel are identified by the identification unit 7A, a whole image of the blood vessel is specified in the volume data.

Upon receipt of frames of an X-ray moving image, the identification unit 7A retrieves, from the storage unit 6 or the like, a threshold and a setting range for the pixel value and/or the transparency corresponding to a blood vessel or the like in the frames. The identification unit 7A may identify the blood vessel or the like based on the information. With this, a whole image of the blood vessel is specified in the frames. The identification unit 7A may specify the whole image of the blood vessel by DSA.

<<Tracking>>

The identification unit 7A performs a search of a blood vessel region and a thinning process, and thereby obtains the tree structure of the blood vessel specified. Specifically, the operator specifies the origin of the tree structure of the blood vessel, or the identification unit 7A specifies any end of the entire blood vessel. The identification unit 7A obtains the center line of the blood vessel by a thinning process as gradually expanding a region corresponding to the blood vessel from the origin or the end (root) as a starting point. Further, the identification unit 7A determines whether there is a node as gradually expanding the region corresponding to the blood vessel. Having determined that there is a node, the identification unit 7A performs the same process for each blood vessel (branch) originating from the node. At the point when there is no node to be found in the process of gradually expanding the region corresponding to the blood vessel and the region cannot be further expanded, the identification unit 7A determines that the blood vessel is a terminal blood vessel (leaf). Having expanded the region to the end of the terminal blood vessel, the identification unit 7A completes the tracking.

<Calculator 7B>

<<Calculate Diameter of Blood Vessel>>

The calculator 7B obtains the diameter of the blood vessel as the identification unit 7A expands the tree structure of the blood vessel region in the volume data or the like. For example, the calculator 7B obtains a length in a direction perpendicular to the center line obtained by the thinning process as a blood vessel diameter.

<<Specify Small Diameter Region>>

The calculator 7B compares the blood vessel diameter with a predetermined threshold. The threshold is determined in advance based on a size (the range of pixels/voxels) that is likely to be removed as noise by noise reduction. In the comparison with the threshold, the calculator 7B specifies a blood vessel having a diameter equal to or less than the threshold. For example, the calculator 7B performs this in a range from one node to another or from one node to a terminal in the tree structure of the blood vessel.

<<Process for Volume Data>>

When the above process is performed on volume data, the calculator 7B operates in the same manner as in the first embodiment. That is, the calculator 7B projects the identified small diameter blood vessel on a plurality of cross-sections (three orthogonal cross-sections, etc.) in different directions in the volume data. The calculator 7B then obtains the energy or area of each of projected images in the cross-sections, and compares values obtained for the projected images. The image processor 8 specifies a cross-section to apply noise reduction to from among the cross-sections based on the comparison result obtained by the calculator 7B.

<<Process for X-Ray Moving Image>>

When the above process is performed on an X-ray moving image, the calculator 7B operates in the same manner as in the second embodiment. That is, the calculator 7B obtains the energy or area of projection data in the frames $t_1$ to $t_n$, and compares values obtained. The image processor 8 controls noise reduction based on the comparison result obtained by the calculator 7B.

(Operation)

Figure 9:
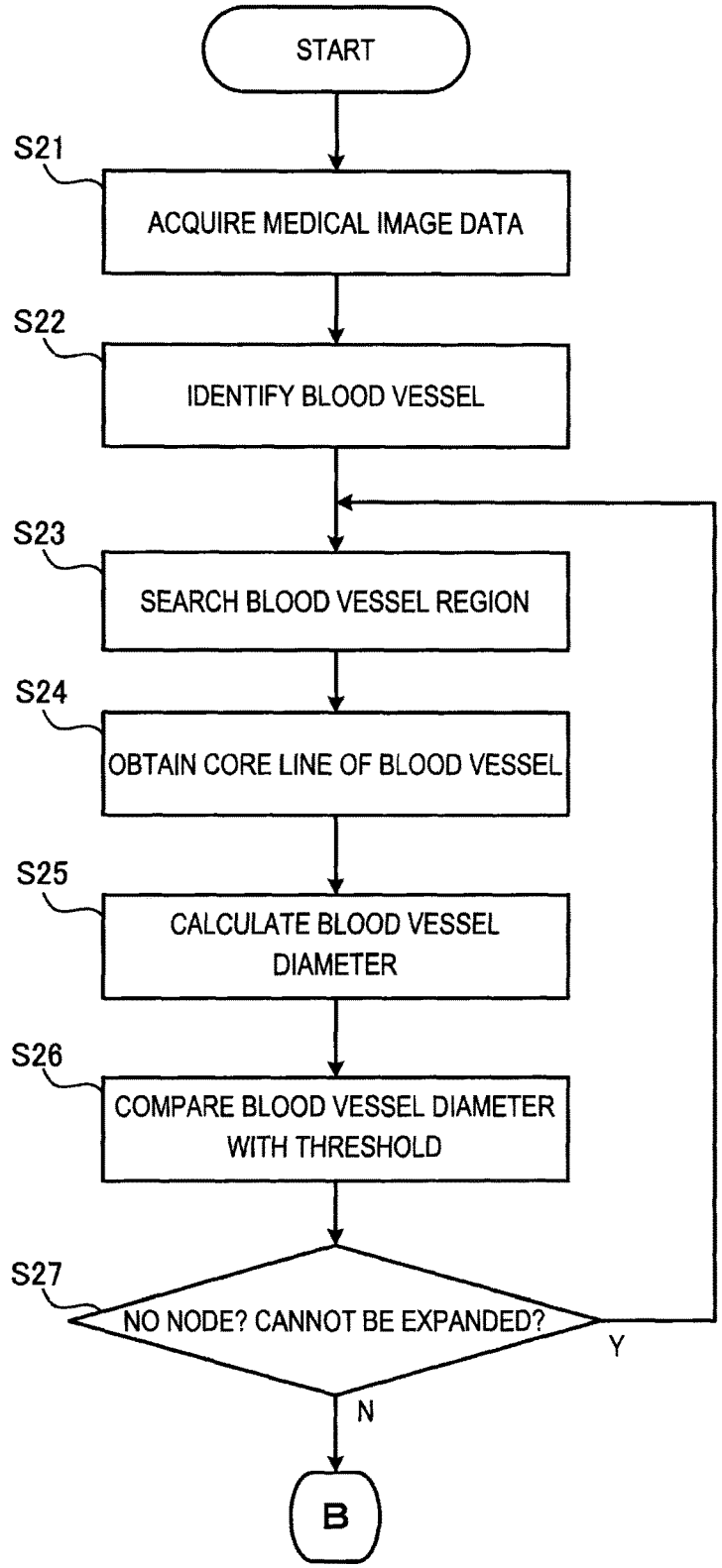
FIG. 9 is a flowchart of the operation of an image processing apparatus according to a third embodiment.
Figure 10:
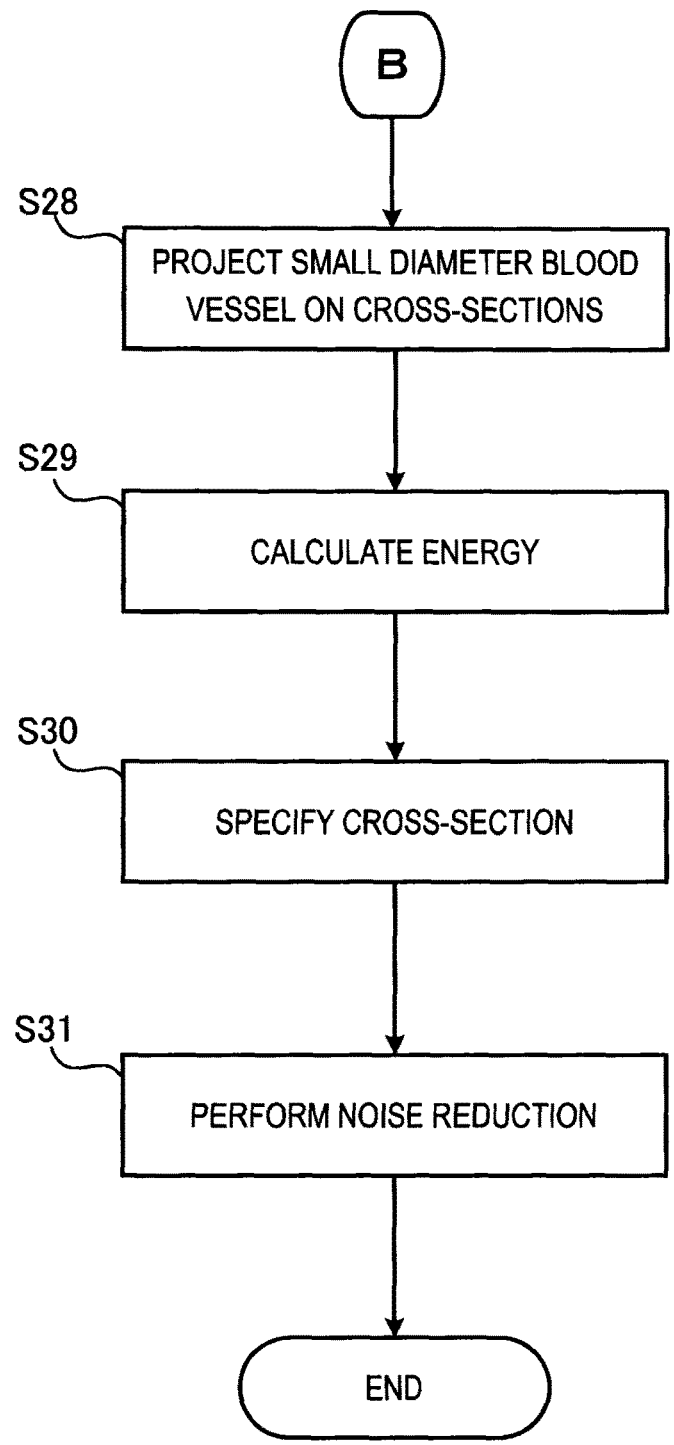
FIG. 10 is a flowchart of the operation of the image processing apparatus of the third embodiment.

In the following, a description is given of the outline of the operation of the image processing apparatus 1 of the third embodiment with reference to FIGS. 9 and 10. FIGS. 9 and 10 are flowcharts of noise reduction process performed by the image processing apparatus 1 of the third embodiment.

<Step S21>

The image processing apparatus 1 acquires medical image data (volume data, X-ray moving image, etc.) from the image storage device 30, the X-ray diagnosis apparatus 100, or the like. The main controller 2 sends the medical image data received by the transceiver 3 to the cross-section specifying unit 7. The following steps are described assuming that the medical image data is volume data.

<Step S22>

Upon receipt of volume data, the identification unit 7A identifies a blood vessel or the like in the volume data based on, for example, the pixel value and the transparency. As voxels indicating the blood vessel are identified, a whole image of the blood vessel is specified in the volume data.

<Step S23>

The operator specifies the origin of the tree structure of the blood vessel, or the identification unit 7A specifies any end of the entire blood vessel. Subsequently, the identification unit 7A gradually expands a region corresponding to the blood vessel from the origin or the end as a starting point.

<Step S24>

The identification unit 7A obtains the center line of the blood vessel by a thinning process as gradually expanding the region.

<Step S25>

The calculator 7B obtains a length in a direction perpendicular to the center line obtained by the identification unit 7A through the thinning process as the diameter of the blood vessel.

<Step S26>

The calculator 7B compares, with a predetermined threshold, the diameter of each blood vessel specified in a predetermined range, such as from one node to another or from one node to a terminal, in the tree structure of the blood vessel. The calculator 7B determines a blood vessel having a diameter equal to or less than the threshold as a small diameter region.

<Step S27>

While gradually expanding the region corresponding to the blood vessel, the identification unit 7A determines whether there is a node and whether the region can be further expanded. Having determined that there is a node or the region can be further expanded (Y in step S27), the identification unit 7A performs the same process (steps S23 to S26) for each blood vessel originating from the node. At the point when there is no node to be found in the process of expanding the region corresponding to the blood vessel and the region cannot be further expanded (N in step S27), the identification unit 7A completes the tracking. Thus, the process moves to step S28.

<Step S28>

After the identification unit 7A has specified a small diameter blood vessel (step S26, etc.) and the tracking has completed, the calculator 7B projects the small diameter blood vessel on the axial plane, the coronal plane, and the sagittal plane in the volume data.

<Steps S29 to S31>

In step S29, the calculator 7B calculates energy in each of the cross-sections in the same manner as step S07 of the first embodiment. Similarly, in step S30, the calculator 7B specifies a cross-section to apply noise reduction to by the comparison of energies in the cross-sections in the same manner as step S08. In step S31, the image processor 8 performs noise reduction on the cross-section specified in the same manner as step S09.

According to the third embodiment, the image processing apparatus 1 obtains the diameter of a blood vessel while tracking the blood vessel by a search of a region of interest (hereinafter, a small diameter blood vessel) as well as a thinning process and the like. The image processing apparatus 1 compares the obtained diameter with a threshold to specify a portion having a diameter equal to or less than the threshold. In the third embodiment, a small diameter blood vessel is specified in this manner.

In the third embodiment, the image processing apparatus 1 projects the small diameter blood vessel on a plurality of cross-sections in different directions in volume data. From among the cross-sections on which the small diameter blood vessel has been projected, the image processing apparatus 1 obtains a cross-section with the least energy (or the largest area of a corresponding portion). The image processing apparatus 1 determines the cross-section with the least energy as a cross-section corresponding to the running direction of the small diameter blood vessel. The image processing apparatus 1 performs noise reduction along the cross-section.

In another example of the third embodiment, the image processing apparatus 1 obtains the energy (or area of the corresponding portion) of projection data of the small diameter blood vessel and the like, and compares the values. The image processing apparatus 1 controls noise reduction based on the result of the comparison.

With this configuration, it is possible to avoid the loss of an object of interest and a decrease in the resolution of the object of interest due to noise reduction using peripheral pixels. Thus, a decrease in the visibility of the object can be prevented in an image based on volume data after noise reduction.

In the third embodiment, the image processing apparatus 1 is configured to specify a fine structure such as a small diameter blood vessel by tracking a region of interest. This enables improvement of accuracy in specifying the region of interest. Thus, a decrease in the visibility of the object can be further prevented in medical image data.

Fourth Embodiment

In the following, a description is given of the image processing apparatus 1 according to the fourth embodiment. In the first and the third embodiments, the image processing apparatus 1 extracts a small diameter blood vessel, projects it on a plurality of cross-sections in different direction, and calculates the energy (or the area) in the cross-sections to determine a cross-section of volume data to apply noise reduction to. In the fourth embodiment, the image processing apparatus 1 obtains the running direction of the extracted small diameter blood vessel for each of predetermined segments as a unit vector. Further, the image processing apparatus 1 obtains the summation of unit vectors thus obtained. The image processing apparatus 1 identifies the running direction of the blood vessel based on the summation.

<Identification Unit 7A>
<<Specify Small Diameter Region>>

As in the first embodiment, the identification unit 7A performs a reduction process or the like on the unprocessed volume data V1 to remove the small vessel region R1, and thereby generates the processed volume data V2 (see FIG. 2). The identification unit 7A then performs threshold processing on the unprocessed volume data V1 and the processed volume data V2 in the same manner as in the first embodiment, thereby extracting blood vessels (the small vessel region R1, the arteriovenous region R2) from the data.

The identification unit 7A subtracts the arteriovenous region R2 extracted from the processed volume data V2 from the small vessel region R1 and the arteriovenous region R2 extracted from the unprocessed volume data V1. With this process, the small vessel region R1 is extracted. In this manner, the identification unit 7A extracts a small diameter blood vessel from volume data.

Note that the identification unit 7A of the fourth embodiment is not limited to the above example, and may be configured to specify a fine structure such as a small diameter blood vessel by tracking a region of interest as in the third embodiment.

<Calculator 7B>
<<Calculate Vector of Predetermined Segment>>

The calculator 7B obtains a unit vector for each predetermined segment of the extracted small diameter blood vessel. The predetermined segment corresponds to a plurality of voxels necessary for the calculation of the running direction. The number of the voxels may be, for example, about 3 to 5. A vector is obtained for each predetermined segment because of the following reasons. If a unit vector is calculated for each voxel, it may interfere with the process of specifying the running direction of a blood vessel due to the influence of noise. A unit vector is obtained because it is enough to obtain components in the direction of the predetermined segments of a blood vessel for specifying the running direction. The operation is simplified by calculating unit vectors. The calculator 7B repeats the calculation of the unit vector of the predetermined segment from the origin of the blood vessel (e.g., an end of an artery or a vein in volume data) to the end of a small diameter blood vessel.

<<Calculate Summation of Vectors>>

Upon completion of the calculation of unit vectors for the entire area of the small diameter blood vessel, the calculator 7B obtains the summation of the unit vectors of the segments.

<<Specify Cross-Section>>

Having obtained the summation of the unit vectors, the calculator 7B specifies the maximum element and the second largest element. The calculator 7B identifies a cross-section corresponding to the maximum element and the second largest element of (ux, uy, uz). For example, if the summations of (ux, uy, uz) are represented as | ux|>| uy|>| uz|, the x-y cross-section is identified in volume data.

While the calculator 7B of the fourth embodiment is described as being configured to simply add unit vectors of predetermined segments, the size of the vectors may be adjusted according to, for example, the blood vessel diameter. As one example, the calculator 7B may multiply the unit vectors by the reciprocal of the blood vessel diameter. With this, the vector of a thinner blood vessel is increased. Thus, a cross-section may be specified while weight is laid on the thinner blood vessel.

As another example, the calculator 7B obtains the blood vessel diameter based on pixels corresponding to the blood vessel identified by the identification unit 7A. The calculator 7B may change the length of the segment for the calculation of the vector based on the blood vessel diameter.

<Image Processor 8>

The image processor 8 specifies the axial plane, the coronal plane, or the sagittal plane having an angle nearest to the cross-section identified by the calculator 7B. For example, the image processor 8 calculates the inner product of the normal unit vector of the cross-section and that of the axial plane, the coronal plane, or the sagittal plane. The image processor 8 determines to apply noise reduction to one of the axial plane, the coronal plane, and the sagittal plane with the largest inner product.

For another example, instead of the inner product, the image processor 8 may calculate an angle between the cross-section identified by the calculator 7B and the axial plane, the coronal plane and the sagittal plane. In this case, the image processor 8 determines to apply noise reduction to one of the axial plane, the coronal plane, and the sagittal plane with the smallest angle to the cross-section. An acute angle is selected for each of the angles.

(Operation)

Figure 11:
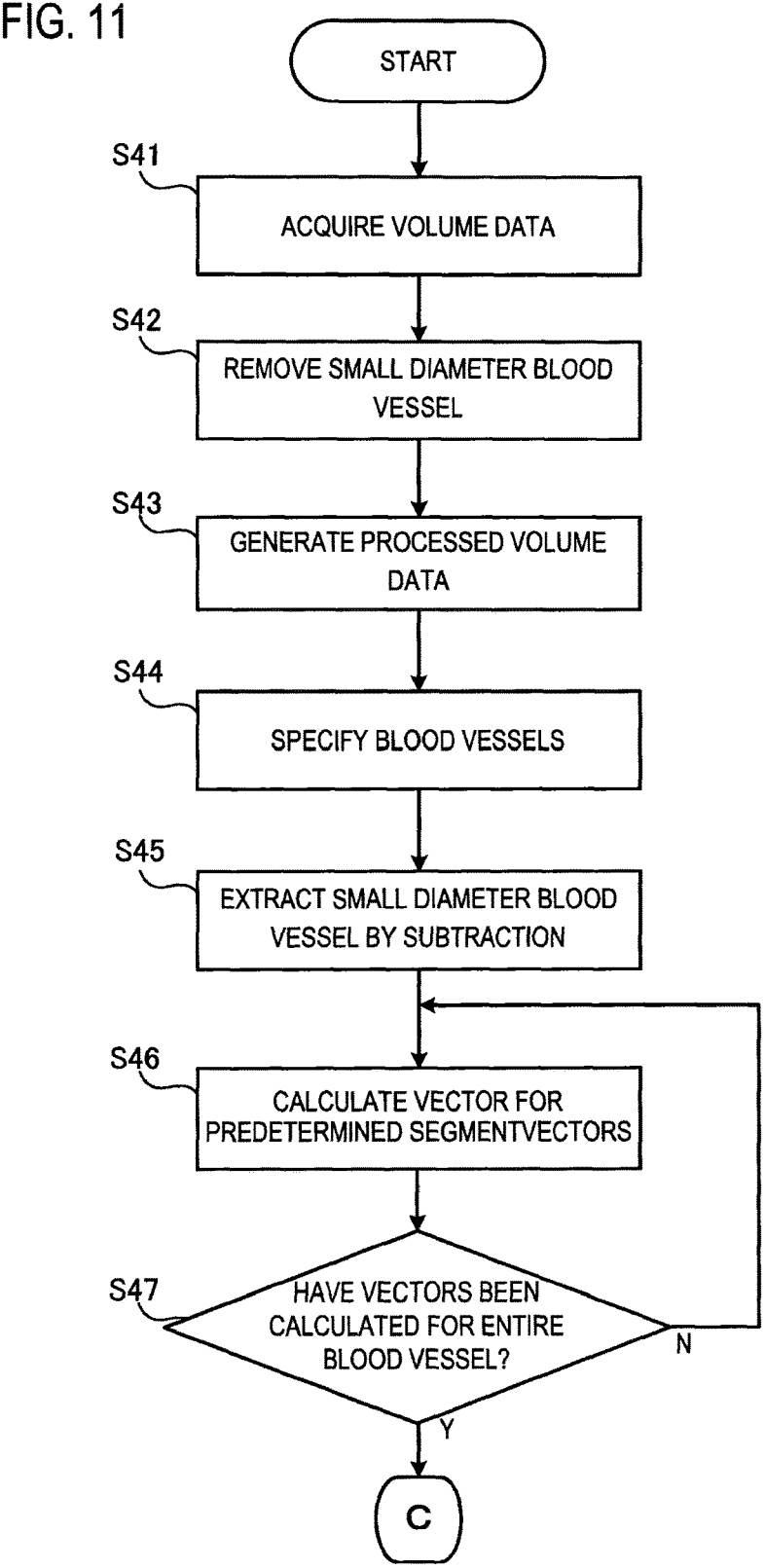
FIG. 11 is a flowchart of the operation of an image processing apparatus according to a fourth embodiment.
Figure 12:
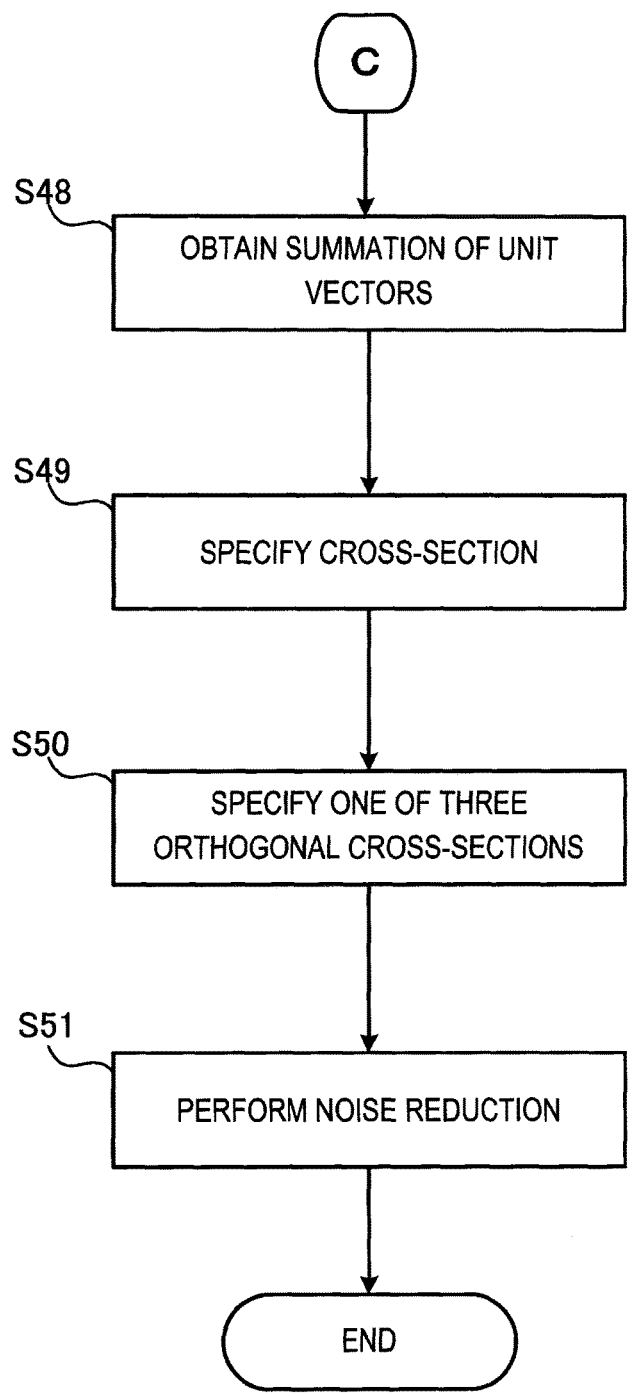
FIG. 12 is a flowchart of the operation of the image processing apparatus of the fourth embodiment.

In the following, a description is given of the outline of the operation of the image processing apparatus 1 of the fourth embodiment with reference to FIGS. 11 and 12. FIGS. 11 and 12 are flowcharts of noise reduction process performed by the image processing apparatus 1 of the fourth embodiment.

<Step S41 to S45>

In step S41, volume data is acquired in the same manner as in step S01 in the first embodiment. Similarly, in step S42, the small vessel region R1 is removed from the unprocessed volume data V1 by a reduction process or the like in the same manner as in step S02. In step S43, the processed volume data V2 is generated in the same manner as in step S03. In step S44, a blood vessel portion is specified in the same manner as in step S04. In step S45, a small diameter blood vessel is extracted by subtraction in the same manner as in step S05.

<Step S46>

The calculator 7B obtains a unit vector for each predetermined segment of the extracted small diameter blood vessel.

<Step S47>

The calculator 7B repeats the calculation of the unit vector of the predetermined segment from the origin of the blood vessel to the end of a small diameter blood vessel. The calculator 7B determines whether unit vectors have been calculated for the entire area of the small diameter blood vessel. Having determined that the calculation of the unit vectors has not been completed (N in step S47), the calculator 7B repeats steps S46 and S47.

<Step S48>

Upon completion of the calculation of the unit vectors for the entire area of the small diameter blood vessel (Y in step S47), the calculator 7B obtains the summation of the unit vectors.

<Step S49>

Having obtained the summation of the unit vectors, the calculator 7B specifies the maximum element and the second largest element. The calculator 7B identifies a cross-section corresponding to the maximum element and the second largest element.

<Step S50>

The image processor 8 specifies the axial plane, the coronal plane, or the sagittal plane having an angle nearest to the cross-section identified by the calculator 7B (step S49).

<Step S51>

The image processor 8 performs noise reduction on the axial plane, the coronal plane, or the sagittal plane specified in step S50.

According to the fourth embodiment, the image processing apparatus 1 calculates a unit vector for each predetermined segment of a small diameter blood vessel extracted, and thereby obtaining the running direction of the blood vessel. The image processing apparatus 1 also obtains the summation of unit vectors thus obtained, and identifies the running direction of the blood vessel based on the summation.

Having obtained the summation of the unit vectors, the image processing apparatus 1 identifies a cross-section corresponding to the maximum element and the second largest element. The image processing apparatus 1 performs noise reduction on one of the three orthogonal cross-sections nearest to the cross-section identified.

With this configuration, it is possible to avoid the loss of an object of interest and a decrease in the resolution of the object of interest due to noise reduction using peripheral pixels. Thus, a decrease in the visibility of the object can be prevented in an image based on volume data after noise reduction.

Besides, the image processing apparatus 1 of the fourth embodiment is configured to obtain a unit vector for each predetermined segment of an extracted fine structure (a small diameter blood vessel. etc.), and calculates the running direction based on the result. This enables improvement of accuracy in specifying the running direction of a region of interest. Thus, a decrease in the visibility of the object can be further prevented in medical image data.

[Modifications]

Described below are modifications of the first to the fourth embodiments.

(Modification 1)

In the third embodiment, the image processing apparatus 1 obtains the diameter of a blood vessel while tracking the blood vessel by a search of a small diameter blood vessel as well as a thinning process and the like. The image processing apparatus 1 compares the obtained diameter with a threshold to specify a portion having a diameter equal to or less than the threshold. However, for example, the image processing apparatus 1 may obtain the running direction of the small diameter blood vessel as follows.

The identification unit 7A performs a search of a small diameter blood vessel and a thinning process to specify the center line of the blood vessel as in the third embodiment. When the identification unit 7A specifies the center line of the blood vessel, the calculator 7B obtains the unit vector of the center line. As in the fourth embodiment, the calculator 7B obtains, for example, the summation of unit vectors thus obtained. The calculator 7B obtains the running direction of the blood vessel based on the summation.

According to the modification 1, it is possible to avoid the loss of an object of interest and a decrease in the resolution of the object of interest due to noise reduction using peripheral pixels.

(Modification 2)

In the first, the third, and the fourth embodiments, the image processing apparatus 1 is described as being configured to perform noise reduction on only one cross-section. However, noise reduction may be applied to a plurality of cross-sections. For example, in the first embodiment, noise reduction may be sequentially performed on the three orthogonal cross-sections.

<In First and Third Embodiments>

The calculator 7B obtains the energy of each of projected images in the three orthogonal cross-sections, and compares values obtained for the projected images. Based on the comparison result obtained by the calculator 7B, the image processor 8 specifies a cross-section with the least energy, a cross-section with the second least energy, and a cross-section with the maximum energy, and performs noise reduction on the cross-sections in this order.

When noise reduction is performed on not three cross-sections but on two cross-sections, the image processor 8 specifies a cross-section with the least energy and a cross-section with the second least energy, and performs noise reduction on the cross-sections in this order.

<In Fourth Embodiment>

The calculator 7B obtains a unit vector for each predetermined segment of an extracted small diameter blood vessel. The calculator 7B obtains the summation of unit vectors thus obtained for each segment. Having obtained the summation of the unit vectors, the calculator 7B specifies the maximum element and the second largest element. The image processor 8 first performs noise reduction on a cross-section corresponding to the maximum element and the second largest element. Next, the image processor 8 performs noise reduction on a cross-section corresponding to the maximum element and the third largest element. After that, the image processor 8 performs noise reduction on a cross-section corresponding to the second largest element and the third largest element.

When noise reduction is performed on not three cross-sections but on two cross-sections, the image processor 8 performs noise reduction on a cross-section corresponding to the maximum element and the second largest element first, and then on a cross-section corresponding to the maximum element and the third largest element.

According to the modification 2, it is possible to avoid the loss of an object of interest and a decrease in the resolution of the object of interest due to noise reduction using peripheral pixels.

(Modification 3)

The above embodiments are described assuming that an object of interest having a fine structure is a blood vessel; however, the object of interest may be a guide wire, a catheter, a stent, a nerve, and the like. In the following, an example is described in which the object of interest is a guide wire.

As in the second embodiment, the identification unit 7A performs subtraction between an image including a catheter and a guide wire captured in real time and an image captured for a predetermined period of time before. With this, regions that indicate the latest movement of the catheter and the guide wire are continuously extracted. Noise reduction is controlled for data in which a region indicating the latest movement of the catheter and the guide wire attracts attention as in the second embodiment. With this configuration, the image processing apparatus 1 can control noise reduction according to the movement of the guide wire. For example, the image processing apparatus 1 can automatically change a noise reduction filter in real time according to the orientation of the guide wire inserted in the subject's body.

According to the modification 3, it is possible to avoid the loss of an object of interest and a decrease in the resolution of the object of interest due to noise reduction using peripheral pixels.

(Modification 4)

In the above embodiments, the identification unit 7A, the calculator 7B, and the image processor 8 determine a cross-section to apply noise reduction to under an analysis program or the like stored in the image processing apparatus 1 in advance; however, the embodiments are not so limited. For example, a cross-section to which noise reduction is to be applied may be determined in advance in an acquisition program, an acquisition protocol, or the like set in advance. The acquisition program is set in advance according to the usage and an area to be examined such as, for example, examination of the head, examination of the abdomen, emergency examination, and the like.

Similarly, in the modification 2, the identification unit 7A, the calculator 7B, and the image processor 8 determine the order to apply noise reduction to the three orthogonal cross-sections under an analysis program or the like stored in the image processing apparatus 1 in advance; however, the modification 2 is not so limited. For example, the order to apply noise reduction to the three orthogonal cross-sections may be determined in advance in an acquisition program, an acquisition protocol, or the like set in advance.

In the acquisition program and the acquisition protocol, cross-sections to apply noise reduction to and the order may be set based on the running direction of an object of interest (blood vessel, etc.).

According to the modification 4, it is possible to avoid the loss of an object of interest and a decrease in the resolution of the object of interest due to noise reduction using peripheral pixels.

(Modification 5)

In the above embodiments, the image processing apparatus 1 obtains the running direction of a group of pixels indicating an object of interest in the entire image data, and determines a cross-section to apply noise reduction to; however, the embodiments are not so limited. For example, the image processing apparatus 1 may obtain the running direction of an object of interest (tubular structure, etc.) for each partial region of the image data instead of the entire data. The image processing apparatus 1 determines a cross-section to apply noise reduction to according to the running direction obtained for each partial region.

Figure 13:
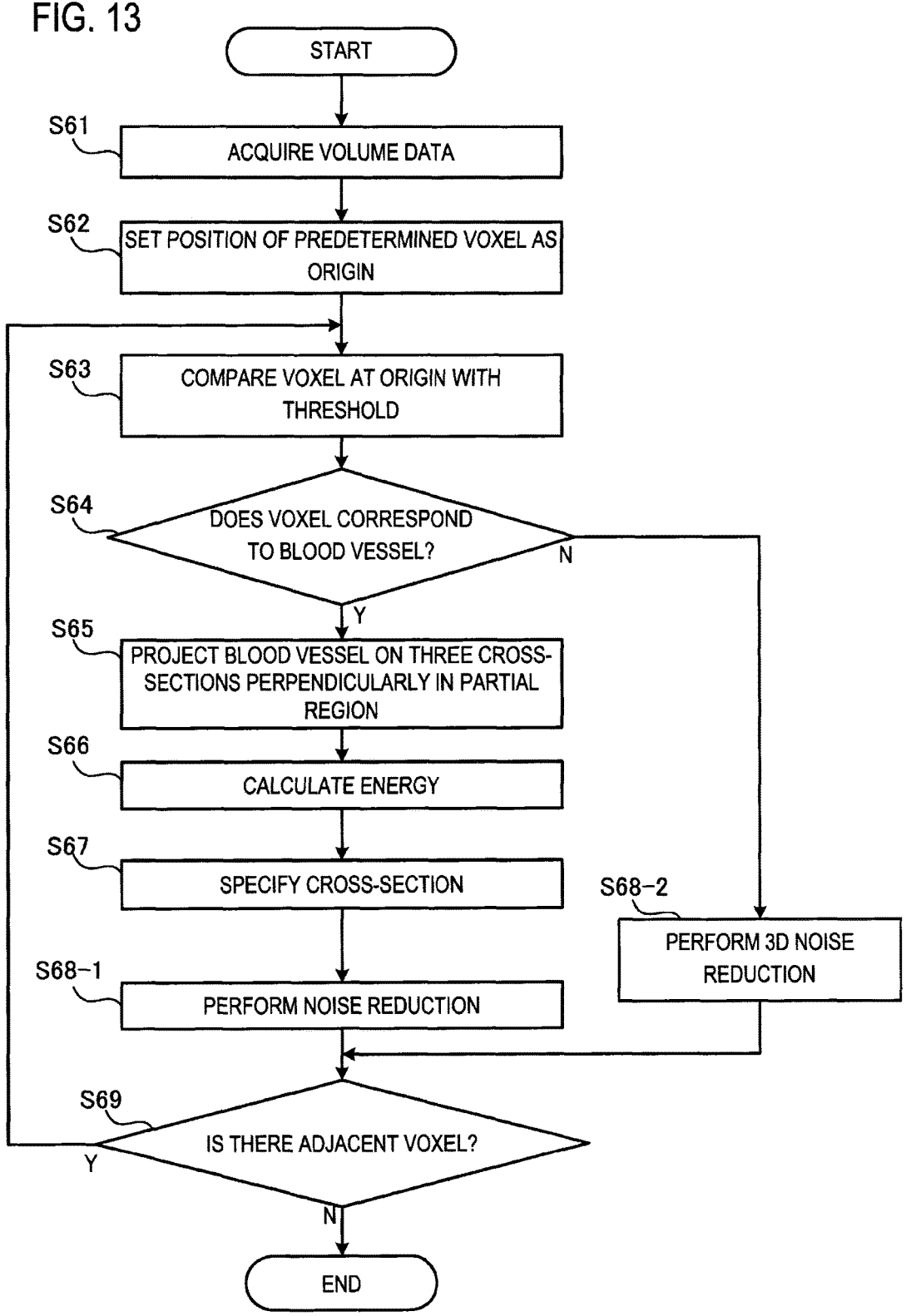
FIG. 13 is a flowchart of the operation of an image processing apparatus according to a modification.

The operation of the modification 5 is described with reference to FIG. 13. FIG. 13 is a flowchart of noise reduction process performed by the image processing apparatus 1 of the modification 5. The image processing apparatus 1 of the modification 5 is outlined as follows. First, the image processing apparatus 1 determines whether each voxel corresponds to a blood vessel. Having determined that the voxel corresponds to a blood vessel, in a partial region (e.g., micro region) including the voxel, the image processing apparatus 1 projects the voxel indicating a blood vessel on three cross-sections. The image processing apparatus 1 performs noise reduction on one of the three cross-sections with the least energy. The image processing apparatus 1 of this modification then moves to an adjacent voxel and repeats these processes.

<Step S61>

In step S61, volume data is acquired in the same manner as in step S01 in the first embodiment.

<Step S62>

The identification unit 7A sets the position of a predetermined voxel as the origin of a series of processes in the volume data.

<Step S63>

The identification unit 7A sequentially determines whether each of voxels corresponds to a blood vessel from the predetermined voxel at the origin. For example, the identification unit 7A obtains the voxel values or the like of voxels i=0, j=0, and k=0 at the origin set in advance, and compares the voxel values with a predetermined threshold.

<Step S64>

The identification unit 7A determines whether the voxel value or the like of each of the voxels exceeds the blood vessel level.

<Step S65>

Having determined that the voxel value or the like of the voxel exceeds the blood vessel level (Y in step S64), the identification unit 7A projects, in a partial region (7×7×7) including the voxel, the voxel on three cross-sections perpendicular to one another. The three orthogonal cross-sections are, for example, the axial plane, the coronal plane, and the sagittal plane in the volume data.

<Step S66 to S68-1>

In step S66, energy is calculated for each of the cross-sections in a manner basically similar to step S07 in the first embodiment. Similarly, in step S67, a cross-section to apply noise reduction to is specified by the comparison of energies in the cross-sections in a manner basically similar to step S08. In step S68-1, noise reduction is performed on the cross-section specified in a manner basically similar to step S09. The steps S66 to S68-1 are different from those of other embodiments in that they are performed for each partial region to be processed in the volume data.

<Step S68-2>

When the identification unit 7A determines that the voxel value or the like of the voxel does not exceed the blood vessel level, and that the voxel does not correspond a blood vessel (N in step S64), the image processor 8 performs intensive noise reduction such as three-dimensional noise reduction.

<Step S69>

After noise reduction is performed in step S68-1 or S68-2, the identification unit 7A determines whether there is a voxel adjacent to the voxel. Having determined that there is an adjacent voxel (Y in step S69), the image processing apparatus 1 performs steps S62 to S68 for the adjacent voxel.

Having determined that there is no adjacent voxel (N in step S69), the image processing apparatus 1 completes the noise reduction process.

According to the modification 5, whether there is an object of interest (a blood vessel, etc.) is determined with respect to each partial region of volume data. If there is an object of interest, its running direction is obtained. Accordingly, detailed noise reduction can be performed according to the running direction. As a result, it is possible to effectively avoid the loss of the object of interest and a decrease in the resolution of the object of interest.

In the modification 5, noise reduction may be performed not only on one of the three orthogonal cross-sections with the least energy but also on others. In this case, the number of times of noise reduction to be applied to the three orthogonal cross-sections may be obtained. For example, from among the three orthogonal cross-sections, the x-y cross-section is specified as a cross-section along the running direction of a group of pixels indicated by an object of interest, and the x-z cross-section is specified as a cross-section substantially perpendicular to the running direction. In this example, the image processing apparatus 1 sets the number of times of noise reduction to be applied to the x-y cross-section to twice. In addition, the image processing apparatus 1 sets the number of times of noise reduction to be applied to the y-z cross-section to once. The image processing apparatus 1 does not perform noise reduction on the x-z cross-section.

(Modification 6)

Figure 14:
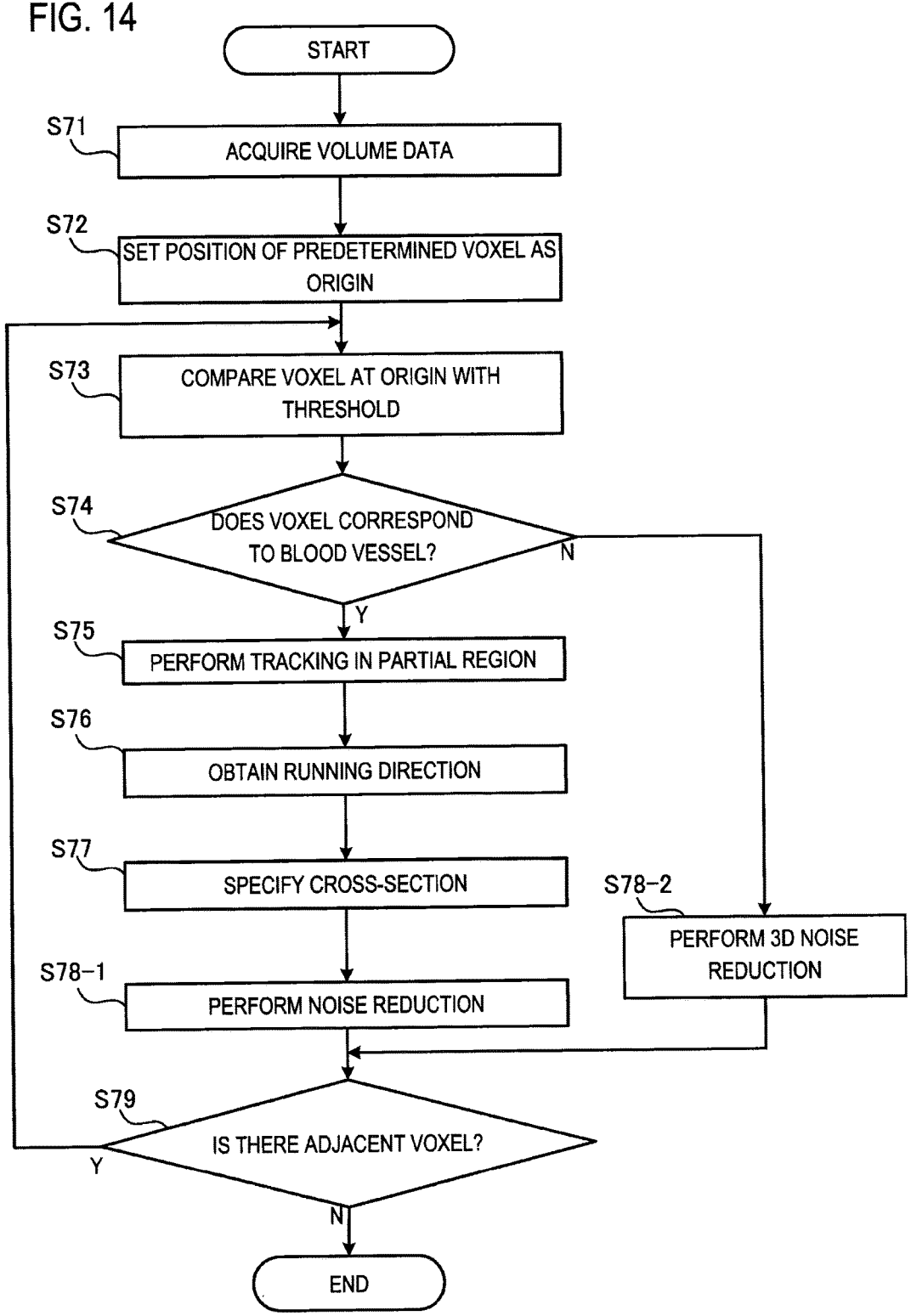
FIG. 14 is a flowchart of the operation of an image processing apparatus according to another modification.

In the modification 5, the image processing apparatus 1 is described as being configured to obtain the running direction of a group of pixels indicated by an object of interest for each partial region of image data, and calculates energy in the three orthogonal cross-sections; however, the image processing apparatus 1 is not so limited. For example, the image processing apparatus 1 may be configured to specify a cross-section to apply noise reduction to in each partial region by tracking (tracing). In the modification 6, this configuration is described with reference to FIG. 14. FIG. 14 is a flowchart of noise reduction process performed by the image processing apparatus 1 of the modification 6.

<Step S71 to S74>

In step S71, volume data is acquired in the same manner as in step S01 in the first embodiment. In step S72, the position of a predetermined voxel is set as the origin in the same manner as in step S62 in the modification 5. Similarly, in step S73, voxel values or the like are compared with a threshold in the same manner as in step S63. In step S74, a determination is made as to whether each voxel indicates a blood vessel in the same manner as in step S64.

<Step S75>

When the identification unit 7A determines that the voxel value or the like of a voxel at the origin exceeds the blood vessel level (Y in step S74), the calculator 7B performs the tracking of an object of interest in a partial region (7×7×7) including the voxel. Specifically, the tracking is performed in the same manner as in steps S23 and S24 in the third embodiment.

<Step S76>

The calculator 7B obtains the running direction of the center line obtained by the tracking of the object of interest such as a blood vessel, and thereby obtains the running direction of a group of pixels indicated by the object of interest. Specifically, the calculator 7B operates in the same manner as in steps S46 to S48 in the fourth embodiment.

<Step S77>

The calculator 7B obtains a cross-section to apply noise reduction to based on the running direction obtained by the tracking. Specifically, the calculator 7B operates in the same manner as in step S49 in the fourth embodiment. The calculator 7B specifies the axial plane, the coronal plane, or the sagittal plane having an angle nearest to the running direction.

<Step S78-1>

The image processor 8 performs noise reduction on a cross-section (the axial plane, the coronal plane, or the sagittal plane) specified in step S77 with respect to the partial region of the volume data.

<Step S78-2>

When the identification unit 7A determines that the voxel value or the like of the voxel at the origin does not exceed the blood vessel level, and that the voxel does not correspond a blood vessel (N in step S74), the image processor 8 performs intensive noise reduction such as three-dimensional noise reduction.

<Step S79>

After noise reduction is performed in step S78-1 or S78-2, the identification unit 7A determines whether there is a voxel adjacent to the voxel. This step is the same as step S69 in the modification 5.

According to the modification 6, the running direction of an object of interest (a blood vessel. etc.) is obtained with respect to each partial region of volume data. Accordingly, detailed noise reduction can be performed according to the running direction of the object of interest. As a result, it is possible to effectively avoid the loss of the object of interest and a decrease in the resolution of the object of interest.

In the modification 6, noise reduction may be performed not only on one of the three orthogonal cross-sections with the least energy but also on others. In this case, the number of times of noise reduction to be applied to the three orthogonal cross-sections may be obtained. For example, from among the three orthogonal cross-sections, the x-y cross-section is specified as a cross-section along the running direction of a group of pixels indicated by an object of interest, and the xz cross-section is specified as a cross-section substantially perpendicular to the running direction. In this example, the image processing apparatus 1 sets the number of times of noise reduction to be applied to the x-y cross-section to twice. In addition, the image processing apparatus 1 sets the number of times of noise reduction to be applied to the y-z cross-section to once. The image processing apparatus 1 does not perform noise reduction on the x-z cross-section.

According to the first to the fourth embodiments and the modifications thereof, cross-sections to apply noise reduction to and the order may be set based on the running direction of an object of interest or the like. Therefore, it is possible to avoid the loss of the object of interest and a decrease in the resolution of the object of interest due to noise reduction using peripheral pixels. Thus, a decrease in the visibility of the object can be prevented in an X image based on volume data after noise reduction.

For example, there is a case where noise reduction is performed on volume data of the head. Among blood vessels of the head, the running direction of a small diameter blood vessel such as a perforator is almost along the body axis direction. Therefore, in the volume data of the head, voxels indicating a blood vessel such as a perforator tend to be similar and adjacent along the body axis direction. Besides, since a perforator or the like has a small diameter, adjacent voxels tend not to be similar to one another along the body width direction of a subject or the body front-back direction (direction from the chest to the back).

According to the first to the fourth embodiments and the modifications thereof, the coronal plane or the sagittal plane is specified as a cross-section to apply noise reduction to based on the running direction or the like of a perforator. Alternatively, the order to apply noise reduction is set such that noise reduction is performed first on one of the coronal plane or the sagittal plane and second on the other. With this, it is possible to avoid the loss of the perforator due to noise reduction using peripheral pixels.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus, comprising:
processing circuitry configured to
identify a group of pixels corresponding to a particular blood vessel as an object of interest in medical image data;
determine pixels defining a particular cross-section projected correspondingly to a running direction of the particular blood vessel and selected from among a plurality of cross-sections having different directions, based on the group of pixels being projected onto each of the plurality of cross-sections having the different directions; and
perform noise reduction on the determined pixels defining the particular cross-section to obtain the determined pixels defining the particular cross-section having less noise.

2. The image processing apparatus of claim 1, wherein the processing circuitry is further configured to compare a portion corresponding to the particular blood vessel with a predetermined diameter, specify a part of the portion having a diameter smaller than the predetermined diameter, and obtain a running direction of the specified part.

3. The image processing apparatus of claim 1, wherein the processing circuitry is further configured to
minimize the medical image data to remove a small diameter blood vessel from a blood vessel as the object of interest, and
obtain a difference between images before and after removal of the small diameter blood vessel to obtain the small diameter blood vessel.

4. The image processing apparatus of claim 1, wherein the processing circuitry is further configured to
specify a plurality of blood vessels and obtain a diameter of each of the specified blood vessels, and
specify the particular blood vessel as the object of interest from among the plurality of blood vessels, the particular blood vessel having a diameter equal to or smaller than a threshold.

5. The image processing apparatus of claim 1, wherein the processing circuitry is further configured to obtain a vector for each of predetermined segments of the particular blood vessel, and obtain a summation of vectors of the segments to determine the cross-section.

6. The image processing apparatus of claim 5, wherein the processing circuitry is configured to obtain the vector, which is a unit vector.

7. The image processing apparatus of claim 5, wherein the processing circuitry is further configured to obtain a diameter of the particular blood vessel based on the group of pixels corresponding to the particular blood vessel, and change a length of the segments used for calculation of the vectors based on the diameter of the particular blood vessel.

8. The image processing apparatus of claim 1, wherein the processing circuitry is further configured to
obtain a matching rate between a pixel value of a target pixel to which the noise reduction is applied and a pixel value of each of peripheral pixels around the target pixel, and determine a weight of each of the peripheral pixels according to the matching rate,
obtain a weighted average of the peripheral pixels based on the determined weight, and
obtain the pixel value of the target pixel based on the matching rate and the weighted average.

9. The image processing apparatus of claim 1, wherein
the medical image data is acquired based on an acquisition program for acquiring the medical image data, and
the processing circuitry is further configured to determine a new cross-section on which the noise reduction is to be performed according to the acquisition program.

10. The image processing apparatus of claim 1, wherein the processing circuitry is further configured to calculate an energy for each of the plurality of cross-sections, and select the particular cross-section, of the plurality of cross-sections, having a lowest calculated energy.

11. An X-ray diagnosis apparatus, comprising:
processing circuitry configured to
generate medical image data;
identify a group of pixels corresponding to a blood vessel as an object of interest in medical image data;

determine pixels defining a particular cross-section projected correspondingly to a running direction of the blood vessel and selected from among a plurality of cross-sections having different directions, based on the group of pixels being projected onto each of the plurality of cross-sections having the different directions; and perform noise reduction on the determined pixels defining the particular cross-section to obtain the determined pixels defining the particular cross-section with less noise.

\* \* \* \* \*